(12) United States Patent
Kurita et al.

(10) Patent No.: US 8,979,170 B2
(45) Date of Patent: Mar. 17, 2015

(54) VEHICLE BODY REAR STRUCTURE

(75) Inventors: Makoto Kurita, Wako (JP); Yasuyuki Katou, Wako (JP); Norihiro Obama, Wako (JP); Yosuke Kimura, Wako (JP); Makoto Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/112,362

(22) PCT Filed: Mar. 13, 2012

(86) PCT No.: PCT/JP2012/056413
§ 371 (c)(1),
(2), (4) Date: Dec. 18, 2013

(87) PCT Pub. No.: WO2012/144279
PCT Pub. Date: Oct. 26, 2012

(65) Prior Publication Data
US 2014/0097644 A1  Apr. 10, 2014

(30) Foreign Application Priority Data

Apr. 19, 2011 (JP) .................................. 2011-093053
Apr. 19, 2011 (JP) .................................. 2011-093097

(51) Int. Cl.
*B60J 5/02* (2006.01)
*B60J 5/10* (2006.01)
*B62D 25/02* (2006.01)
*B62D 25/04* (2006.01)
(Continued)

(52) U.S. Cl.
CPC .................. *B60J 5/101* (2013.01); *B62D 25/02* (2013.01); *B62D 25/04* (2013.01); *E05D 11/0054* (2013.01); *E05Y 2201/11* (2013.01); *E05Y 2900/546* (2013.01); *B60Q 1/0035* (2013.01); *B60Q 1/30* (2013.01); *B60Q 1/0064* (2013.01); *B62D 25/08* (2013.01)
USPC ....................................................... 296/146.8

(58) Field of Classification Search
CPC ......... A01K 85/16; A61F 13/72; A61F 13/74; A63C 9/0805; A63C 9/0842; E06B 3/485; E05D 15/165; E05D 15/24; E05D 15/242; E05Y 2900/106
USPC .............. 296/146.8, 76, 146.7, 146.9, 146.11
See application file for complete search history.

(56) References Cited

U.S. PATENT DOCUMENTS 3,181,911 A * 5/1965 Peras ........................... 296/37.1
4,261,612 A * 4/1981 Chrysler et al. ........... 296/146.8
(Continued)

FOREIGN PATENT DOCUMENTS

JP      10-016567     1/1998
JP      2003-048432   2/2003
(Continued)

*Primary Examiner* — Kiran B Patel
(74) *Attorney, Agent, or Firm* — Rankin, Hill & Clark LLP

(57) ABSTRACT

A vehicle body rear structure that is able to rotatably support a tailgate at a left hinge attachment section of a rear outer panel with a left hinge member therebetween. The left hinge member is provided with: a vehicle-body-side hinge section affixed to the left hinge attachment section; and a door-side hinge section connected rotatably to the vehicle-body-side hinge section. A left rear combination lamp is provided to the rear outer panel in a manner so as to cover the vehicle-body-side hinge section from the outside of the vehicle body.

14 Claims, 18 Drawing Sheets

(51) Int. Cl.
  *B60Q 1/00*     (2006.01)
  *B60Q 1/30*     (2006.01)
  *B62D 25/08*    (2006.01)
  *E05D 11/00*    (2006.01)

(56) References Cited

U.S. PATENT DOCUMENTS

| | | | |
|---|---|---|---|
| 4,570,291 A * | 2/1986 | Smith et al. | 16/250 |
| 5,195,214 A * | 3/1993 | Lautenschlager et al. | 16/382 |
| 5,195,215 A * | 3/1993 | Kiefer | 16/387 |
| 5,235,724 A * | 8/1993 | Perrin et al. | 16/97 |
| 5,611,114 A * | 3/1997 | Wood et al. | 16/366 |
| 5,960,519 A * | 10/1999 | Thompson et al. | 16/308 |
| 6,038,738 A * | 3/2000 | Neag et al. | 16/324 |
| 6,453,511 B2 * | 9/2002 | Sato | 16/360 |
| 6,477,738 B1 | 11/2002 | Kremer et al. | 16/342 |
| 6,584,647 B2 * | 7/2003 | Jacquin | 16/371 |
| 6,591,452 B2 * | 7/2003 | Jacquin | 16/332 |
| 6,718,596 B2 * | 4/2004 | Kohlstrand et al. | 16/374 |
| 6,719,354 B2 * | 4/2004 | Holt | 296/146.11 |
| 6,845,547 B2 * | 1/2005 | Ham | 16/374 |
| 6,901,704 B2 * | 6/2005 | Sakaue et al. | 49/340 |
| 7,059,655 B2 * | 6/2006 | Ham | 296/146.12 |
| 7,076,836 B1 * | 7/2006 | Butka | 16/342 |
| 7,197,797 B2 * | 4/2007 | Janczak et al. | 29/11 |
| 7,325,276 B2 * | 2/2008 | Kim | 16/262 |
| 7,469,446 B1 * | 12/2008 | Brown et al. | 16/334 |
| 7,487,572 B2 * | 2/2009 | Nelson | 16/334 |
| 7,585,013 B2 * | 9/2009 | Brown et al. | 296/146.11 |
| 7,596,831 B2 * | 10/2009 | Faubert et al. | 16/334 |
| 7,610,657 B2 * | 11/2009 | Doswell et al. | 16/334 |
| 7,618,084 B2 * | 11/2009 | Kimura | 296/146.8 |
| 7,648,189 B2 * | 1/2010 | Porat et al. | 296/146.4 |
| 7,669,916 B2 * | 3/2010 | Munenaga et al. | 296/146.8 |
| 7,725,990 B2 * | 6/2010 | Patzold | 16/387 |
| 7,735,195 B2 * | 6/2010 | Brown et al. | 16/286 |
| 7,748,768 B2 * | 7/2010 | Hofacker et al. | 296/146.11 |
| 7,849,561 B2 * | 12/2010 | Brown et al. | 16/286 |
| 7,895,712 B2 * | 3/2011 | Krumbiegel et al. | 16/367 |
| 7,908,712 B2 * | 3/2011 | Rudzewski et al. | 16/375 |
| 7,921,514 B2 * | 4/2011 | Anillo Crespo et al. | 16/266 |
| 7,941,897 B1 * | 5/2011 | Ham | 16/374 |
| 7,946,017 B2 * | 5/2011 | Brown et al. | 29/426.6 |
| 8,127,401 B2 * | 3/2012 | Folk et al. | 16/374 |
| 8,151,417 B1 * | 4/2012 | Ham | 16/374 |
| 8,156,611 B2 * | 4/2012 | Machin et al. | 16/261 |
| 8,167,341 B2 * | 5/2012 | Gruber et al. | 292/216 |
| 8,256,825 B1 * | 9/2012 | Dryja | 296/146.8 |
| 8,523,269 B2 * | 9/2013 | Igura | 296/146.8 |
| 8,662,562 B2 * | 3/2014 | Ackermann | 296/146.11 |
| 8,690,220 B2 * | 4/2014 | Tsukiyama et al. | 296/56 |
| 8,740,281 B2 * | 6/2014 | Binder et al. | 296/76 |
| 2005/0264029 A1 * | 12/2005 | Bodner | 296/146.8 |
| 2006/0261634 A1 * | 11/2006 | McIntyre et al. | 296/146.8 |
| 2006/0273619 A1 * | 12/2006 | Miller et al. | 296/146.8 |
| 2006/0273621 A1 * | 12/2006 | Shaw et al. | 296/146.11 |
| 2009/0121516 A1 * | 5/2009 | Ljungqvist et al. | 296/146.8 |
| 2009/0167053 A1 * | 7/2009 | Walker et al. | 296/146.11 |
| 2009/0243342 A1 * | 10/2009 | Christensen et al. | 296/193.08 |
| 2009/0282648 A1 * | 11/2009 | Lee | 16/297 |
| 2014/0159428 A1 * | 6/2014 | Katou et al. | 296/193.08 |
| 2014/0203591 A1 * | 7/2014 | Lathwesen | 296/146.8 |

FOREIGN PATENT DOCUMENTS

| | | |
|---|---|---|
| JP | 2007-176273 | 7/2007 |
| JP | 2007-290566 | 11/2007 |
| JP | 2008-013018 | 1/2008 |
| JP | 2009-073265 | 4/2009 |

* cited by examiner

FIG.5
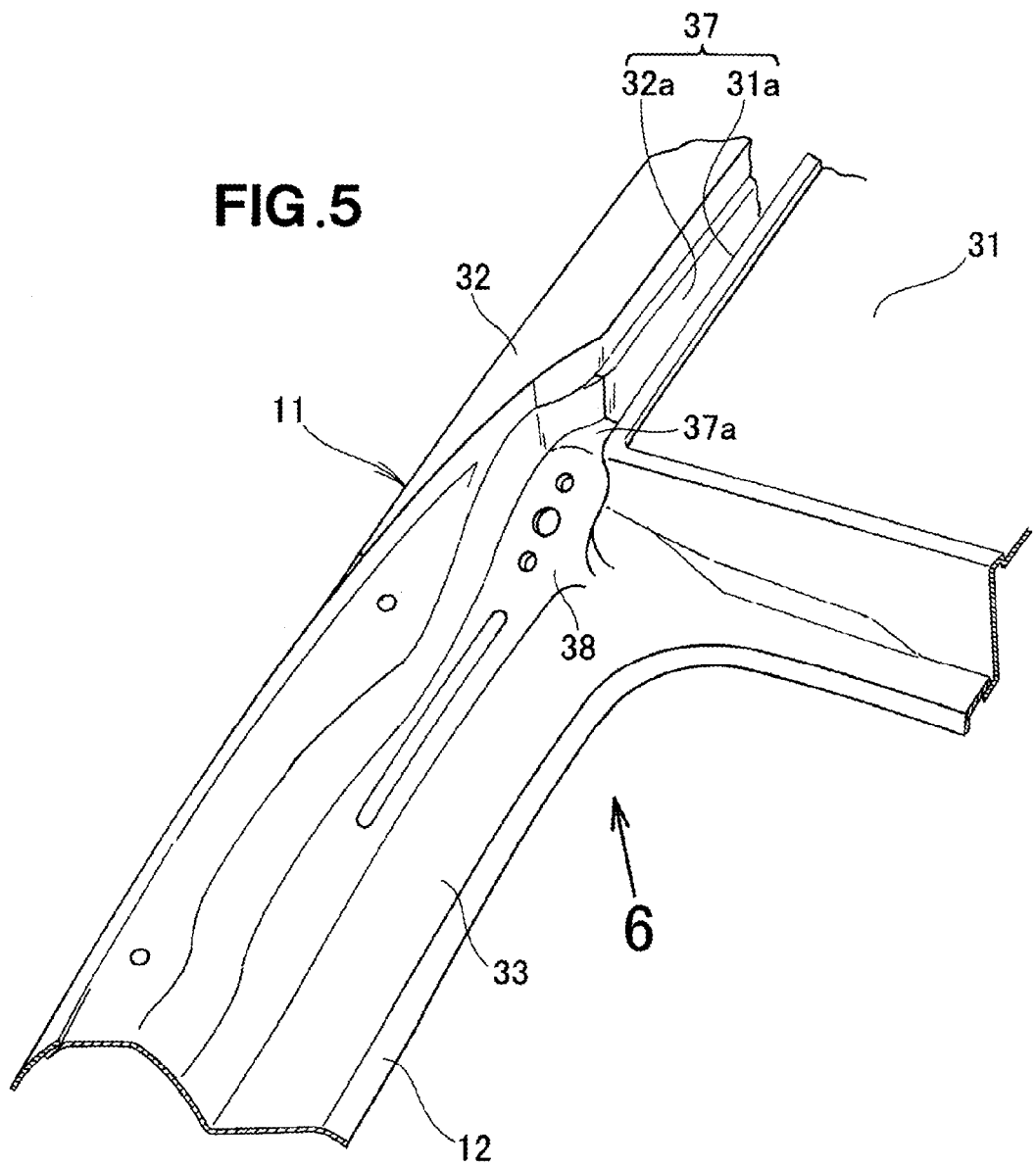
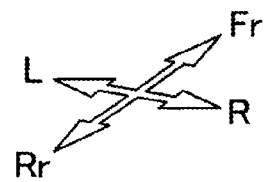

FIG.10
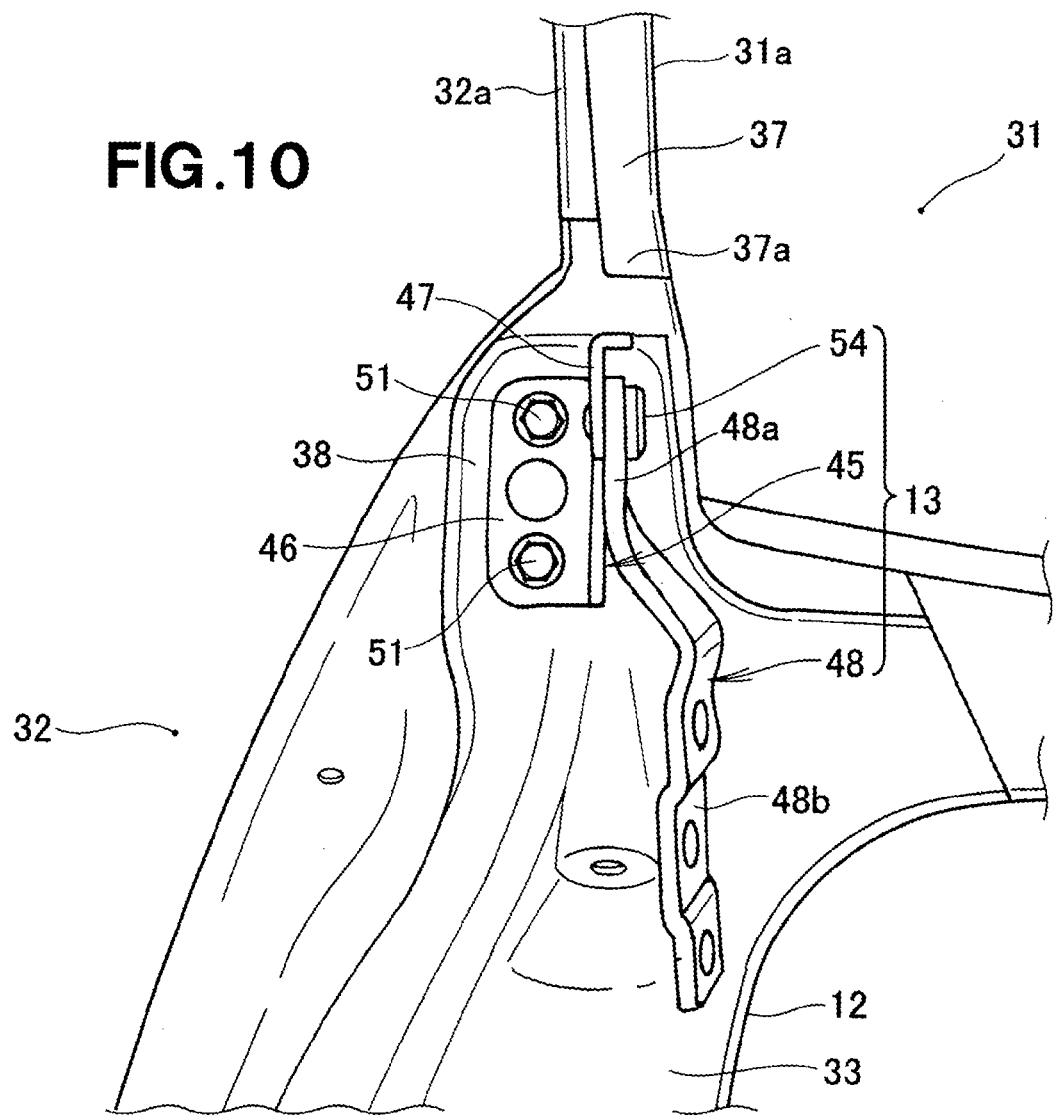
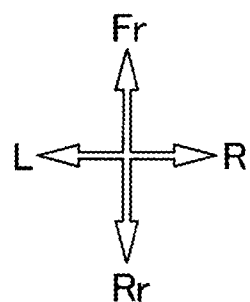

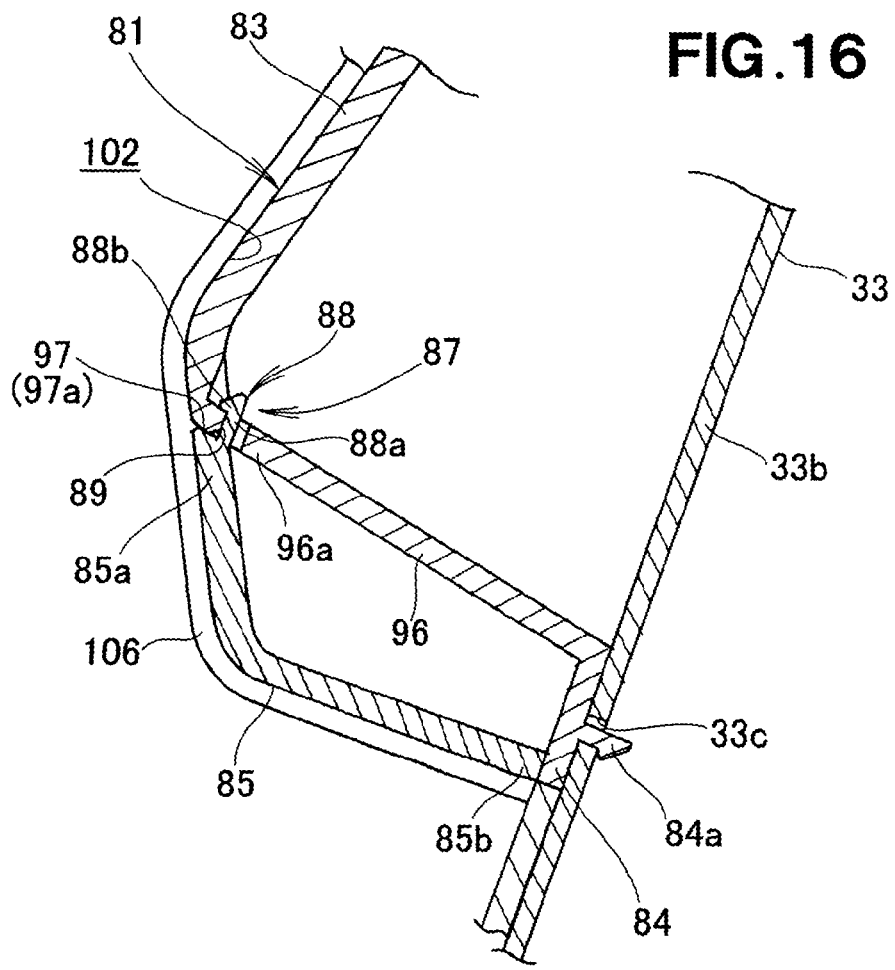
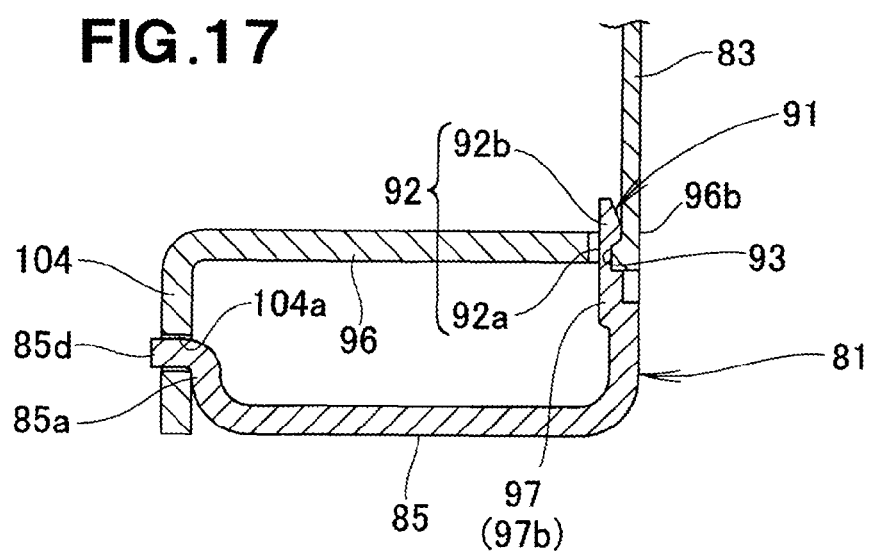

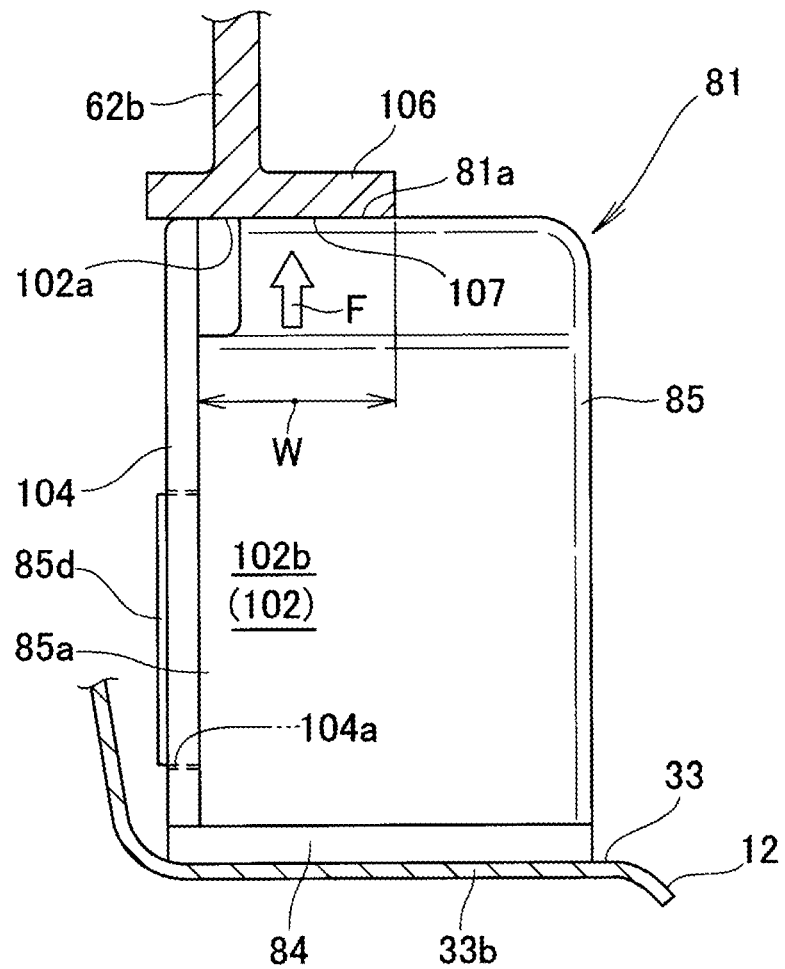

FIG.19
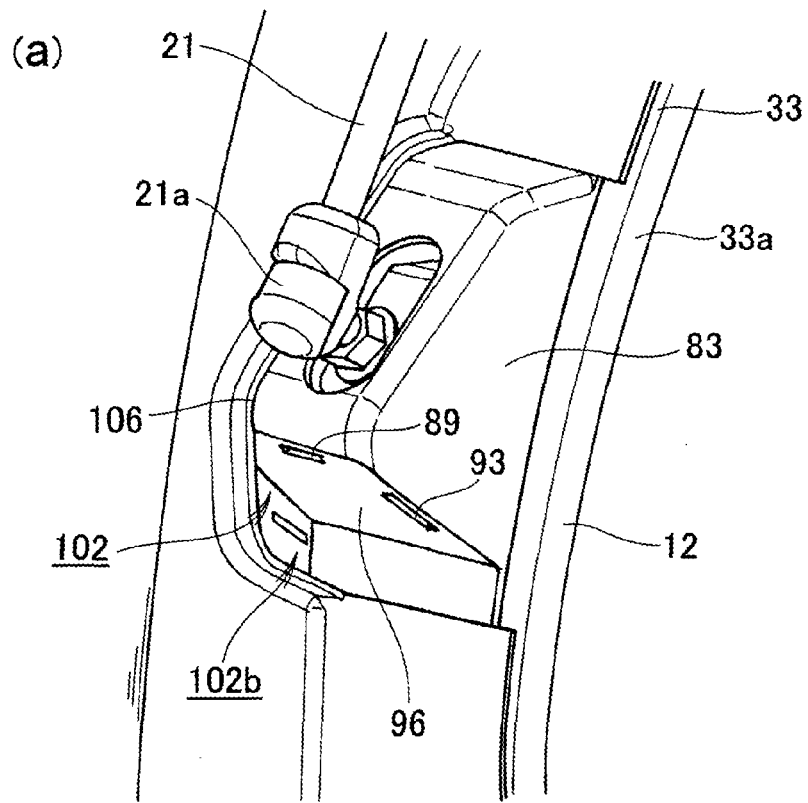
(a)
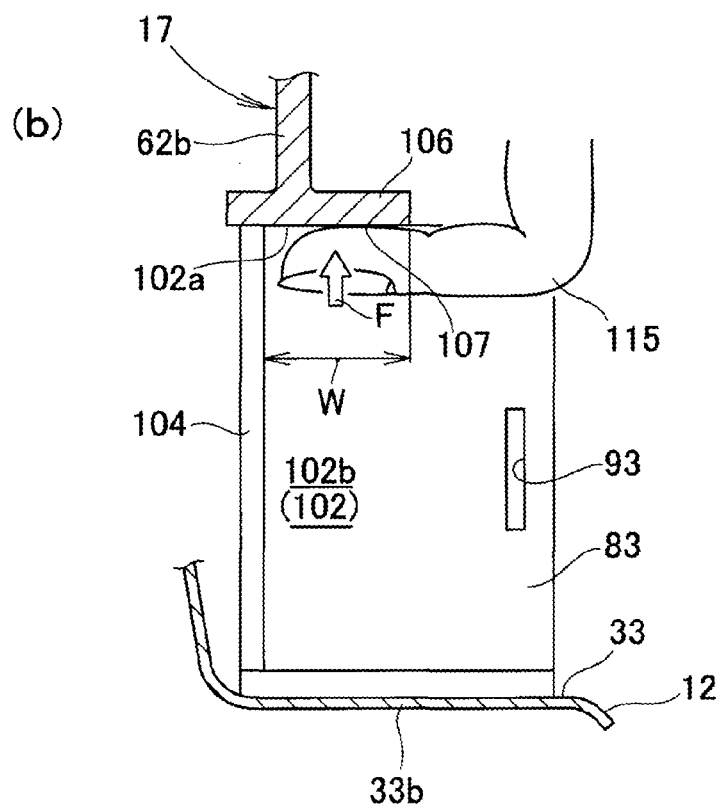
(b)

VEHICLE BODY REAR STRUCTURE

TECHNICAL FIELD

The present invention relates to a vehicle rear body structure or rear vehicle body structure in which a tailgate is pivotably supported on a rear section of a vehicle body via hinge members, and in which an opening section in the rear section of the vehicle body is openable and closable by pivoting movement of the tailgate.

BACKGROUND ART

An example of such a type of rear vehicle body structure is known, for example, from Patent Literature 1, in which a tailgate is openably/closably provided on a rear section of the vehicle body via hinge members and in which the hinge members are covered with respective cover members. More specifically, an opening section is provided in the rear section of the vehicle body, and the tailgate is openably and closably connected to an upper end portion of the opening section by means of the hinge members. The opening section is closed by the tailgate being moved to a closing position and is opened by the gate being moved to an opening position.

In the rear vehicle body structure disclosed in Patent Literature 1 vehicle, the hinge members are covered with the respective cover members so that the hinge members cannot been seen from the outside of the vehicle to thereby improve an outer appearance of the vehicle.

However, because the rear vehicle body structure disclosed in Patent Literature 1 is constructed to cover the hinge members with the respective dedicated cover members, the number of necessary component parts would increase, and such an increased number of component parts tends to hinder cost reduction of the vehicle.

PRIOR ART LITERATURE

Patent Literature 1: Japanese Patent Application Laid-Open Publication No. 2008-13018

SUMMARY OF INVENTION

Technical Problem

It is therefore an object to provide an improved rear vehicle body structure which can not only secure an improved outer appearance but also reduce the number of necessary component parts.

Solution to Problem

According to an invention of claim 1, there is provided a rear vehicle body structure comprising a rear outer panel provided on a rear section of a vehicle body and a tailgate pivotably supported on a hinge mounting section of the rear outer panel via a hinge member, the rear outer panel having an opening section openable and closable by the tailgate, characterized in that the hinge member includes a vehicle-body-side hinge section fixed to the hinge mounting section, and a door-side hinge section pivotably connected at one end portion thereof to the vehicle-body-side hinge section and fixed at another end portion to the tailgate, a lighting member covering the vehicle-body-side hinge section from outside of the vehicle body being provided on the rear outer panel.

Preferably, as recited in claim 2, the vehicle-body-side hinge section includes a fixed portion fixed to the hinge mounting section, and a support portion projecting upward from the fixed portion toward the outside of the vehicle body and having the one end portion of the door-side hinge section pivotably supported thereon. The support portion is disposed along the inner side edge, facing toward a widthwise middle of the vehicle, of the lighting member, and the door-side hinge section is pivotably supported, at one end portion thereof, on the support portion from a side opposite from the inner side edge of the support portion.

Preferably, as recited in claim 3, an outer side, facing toward the outside of the vehicle body, of the hinge mounting section is formed in an inwardly concaved shape.

Preferably, as recited in claim 4, the rear vehicle body structure of the present invention further comprises: a roof panel provided on a ceiling section of the vehicle body; a side panel provided on a side section of the vehicle body by being joined to the roof panel; and a rear outer panel provided on the rear section of the vehicle body by being joined to the side panel and the roof panel. The hinge mounting section is provided continuously with a rear end part of a roof groove portion formed to extend in a front-rear direction of the vehicle body by the roof panel and the side panel being joined with each other.

Preferably, as recited in claim 5, the rear vehicle body structure of the present invention further comprises a rear inner panel provided inward of the rear outer panel, and a reinforcing member provided inward of the rear outer panel and at a position corresponding to the hinge mounting section, and the reinforcing member is joined to the rear inner panel, the roof panel and the side panel.

Preferably, as recited in claim 6, the lighting member has a surface section provided on an outer surface of the vehicle body, and a housing section provided inward of the surface section, and the surface section has a transparent section for transmitting therethrough light from a light source provided inside the housing section, and an opaque section for reflecting external light, the vehicle-body-side hinge section being covered with the opaque section.

Preferably, as recited in claim 7, the opaque section is provided on an edge portion of the surface section, and a housing extension portion is provided on the edge portion to extend from the housing section.

Preferably, as recited in claim 8, the housing extension portion has a reinforcing rib formed integrally therewith.

Preferably, as recited in claim 9, the rear vehicle body structure of the present invention further comprises: a stay that connects the tailgate to a peripheral edge portion, extending along the opening section, of the rear outer panel and that expands and contracts in response to opening and closing movement, respectively, of the tailgate; and a stay cover provided on a stay mounting part of the peripheral edge portion to thereby cover the stay mounting part. The housing portion of the lighting member is provided on the peripheral edge portion, the housing portion has a housing opening portion formed therein along a contour of the stay cover, and the stay cover includes a cover body provided on the mounting part of the peripheral edge portion and covering a lower end portion of the stay, and a cover cap detachably attached to the cover body, the housing opening portion being openable by detachment of the cover cap from the cover body.

Preferably, as recited in claim 10, the stay is connected at an upper end portion thereof to the tailgate and connected at a lower end portion thereof to the mounting section of the rear outer panel, the lower end portion of the stay is covered with the cover body and inserted through a through-hole formed in an upper portion of the cover body, and the cover cap is detachably attached to a lower side of the cover body.

Preferably, as recited in claim 11, the rear vehicle body structure of the present invention further comprises a mounting base provided on the mounting part of the peripheral edge portion and accommodated in the cover body, and the lower end portion of the stay is connected to the mounting base.

Preferably, as recited in claim 12, the cover body includes an abutting portion provided within the housing section and inward of the housing opening portion, the abutting portion being abuttingly engageable with the cover cap.

Preferably, as recited in claim 13, the housing section has a flange portion projecting from a peripheral edge of the housing opening portion along the cover cap.

Preferably, as recited in claim 14, the cover cap has a first locking portion that detachably supports one edge part of a cap's engaging portion, engageable with the cover body, on the cover body, the one edge part of the cap's engaging portion extending away from the rear outer panel, and a second locking portion that detachably supports another edge part of the cap's engaging portion on the cover body, the other edge part of the cap's engaging portion extending away from the housing opening portion.

Advantageous Effects of Invention

In the invention recited in claim 1, the lighting member is provided on the rear outer panel in such a manner as to cover the vehicle-body-side hinge section from the outside of the vehicle body, so that the vehicle-body-side hinge section can be hidden by the lighting member. Thus, when the tailgate is in a position opening the opening section, the vehicle-body-side hinge section can be made hardly seen from the outside of the vehicle, so that an improved outer appearance of the vehicle can be secured.

Further, because the vehicle-body-side hinge section is covered with the lighting member, it is not necessary to provide a separate member dedicated to covering the vehicle-body-side hinge section, which can thereby reduce the number of necessary component parts and hence the necessary cost.

In the invention recited in claim 2, the support portion is disposed along the inner side edge of the lighting member, and the door-side hinge section is pivotably supported, at the one end portion thereof, on the support portion from the side opposite from the inner side edge of the support portion. Thus, the support portion can be disposed adjacent to the inner side edge of the lighting member. Thus, it is possible to increase a range over which the support section (i.e., vehicle-body-side hinge section) is covered with the lighting member. In this way, it is possible to secure an improved outer appearance of the vehicle.

Further, because the door-side hinge section is supported on the support section from the side opposite from the inner side edge, there is no possibility that pivoting movement of the door-side hinge section is disturbed or prevented by the inner side edge. In this manner, it is possible to secure an optimal pivoting range of the door-side hinge section so that the tailgate can be opened to an easy-to-use position.

In the invention recited in claim 3, the hinge mounting section is formed in an inwardly concaved shape, and thus, the hinge mounting section can have an increased strength by virtue of the above-mentioned inwardly concaved shape. In this way, the hinge member can be firmly fixed to the hinge mounting section, and thus, the tailgate can be firmly mounted on the rear section of the vehicle body.

In the invention recited in claim 4, the roof groove portion is a portion extending in the front-rear direction of the vehicle body and has a high strength. Thus, with the hinge mounting section provided continuously with the rear end part of the roof groove portion, the strength of the hinge mounting section can be even further increased, so that the hinge member can be mounted on the hinge mounting section even more firmly.

In the invention recited in claim 5, the rear inner panel is provided inward of the rear outer panel, the reinforcing member is provided inward of the rear outer panel and at a position corresponding to the hinge mounting section, and the reinforcing member is joined to the rear inner panel, the roof panel and the side panel. The hinge mounting section thus reinforced by the reinforcing member can even further increase the strength of the hinge mounting section. In this way, the vehicle-body-side hinge section can be even more firmly fixed to the hinge mounting section.

In the invention recited in claim 6, the surface section has the opaque section, so that the vehicle-body-side hinge section is covered with the opaque section. Thus, the hinge member 13 (particularly the vehicle-body-side hinge section) can be effectively covered with the lighting member, with the result that an improved outer appearance of the vehicle can be secured.

In the invention recited in claim 7, the opaque section is provided on the edge portion of the surface section, and the housing extension portion is provided on the edge portion to extend from the housing section. Thus, the opaque section can be reinforced (supported) by the housing extension portion, so that a sufficient strength of the opaque section can be secured.

In the invention recited in claim 8, the housing extension portion has the reinforcing rib formed integrally therewith, so that the housing extension portion can be even further increased in strength. In this way, a sufficient strength of the opaque section can be secured even more reliably by the housing extension portion and the reinforcing rib.

In the invention recited in claim 9, the housing portion has the housing opening portion formed therein along the contour of the stay cover, so that the housing opening portion can be closed with the stay cover. Thus, when the tailgate is in the opening position, the housing opening portion can be made hardly seen from the outside of the vehicle, with the result that an improved outer appearance of the vehicle can be secured.

Further, the stay cover is divided in two parts, i.e. the cover body and the cover cap, and a part of the housing opening portion can be opened by detachment of the cover cap from the cover body. The part of the housing opening portion opened as above can be used as a finger hooking portion. Thus, such a finger hooking portion can be provided at a desired position neat the stay without being influenced by the stay. In this way, a human operator can apply an outward detaching force to the lighting member with a finger hooked on the finger hooking portion, with the result that the human operator can readily detach the lighting member from the rear outer panel and thus operability in detaching the lifting member can be enhanced.

In the invention recited in claim 10, the lower end portion of the stay is covered with the cover body, the through-hole is formed in the upper portion of the cover body for passage therethrough of the lower end portion of the stay, and the cover cap is detachably attached to the lower side of the cover body. Thus, the cover cap is detachably attached to the lower side of the cover body opposite from the stay. Therefore, the finger hooking portion can be provided at a position (i.e., lower side of the cover body). In this way, the human operator can hook a finger on the finger hooking portion without being restricted (disturbed) by the stay and thereby detach the lighting member with an even further increased ease.

In the invention recited in claim 11, the mounting base is provided on the mounting part of the peripheral edge portion, and the lower end portion of the stay is connected to the mounting base. With the lower end portion of the stay connected to the mounting base, the stay can be spaced from the mounting part of the peripheral edge portion. In this way, it is possible to enhance a degree of design freedom in determining a mounting angle and pivoting angle of the stay.

Further, because the mounting base is provided within the cover body, it can be disposed on a side opposite from the cover cap. Thus, the human operator can hook a finger on the finger hooking portion without being restricted (disturbed) by the mounting base and thereby detach the lighting member with an even further increased ease.

In the invention recited in claim 12, the abutting portion is provided within the housing section and inward of the housing opening portion, and the abutting portion is abuttingly engageable with the cover cap. Thus, when the cover cap is to be mounted on or attached to the cover body, the cover cap can be easily positioned at a predetermined mounting position as the cover cap abuts against the abutting portion. In this way, operability in mounting or attaching the cover cap can be enhanced.

In the invention recited in claim 13, the housing section has the flange portion projecting from the peripheral edge of the housing opening portion along the cover cap. Thus, the flange portion can be provided in the finger hooking portion. Thus, a finger hooked on the finger hooking portion can contact, or be abutted against, the flange portion. In this way, it is possible to secure a wide finger hooking region (area), and thus, the human operator can readily hook a finger on the finger hooking portion and efficiently apply an outward detaching force to the lighting member. As a result, the present invention can even further enhance the operability in detaching the lighting member.

In the invention recited in claim 14, the cover cap is abuttingly engageable with the abutting portion and rear outer panel. With the first locking portion, the one edge part of the cap's engaging portion extending away from the rear outer panel is detachably supported on the cover body. Further, with the second locking portion, the other edge part of the cap's engaging portion extending away from the housing opening portion is detachably supported on the cover body. In this way, the cover cap can be reliably attached to the cover body by means of the first and second locking portions.

Further, the cover cap is attachable and detachable to and from the cover body by the first and second locking portions being merely engaged and disengaged. In this way, operations for attaching and detaching the cover cap can be facilitated, and thus, the lighting member can be detached with an enhanced operability.

BRIEF DESCRIPTION OF DRAWINGS

FIG. 5 is a perspective view of a side panel and a rear outer panel shown in FIG. 3;

FIG. 10 is a plan view corresponding to FIG. 9 but with a left rear combination lamp removed;

FIG. 16 is a sectional view showing a first locking portion between a cover body and the cover cap;

FIG. 17 is a sectional view showing a second locking portion between the cover body and the cover cap;

FIG. 18 is a sectional view taken along line 18-18 of FIG. 12; and

FIG. 19 is a view showing an example manner in which the left rear combination lamp is detached from the rear outer panel.

DESCRIPTION OF EMBODIMENTS

Figure 1:
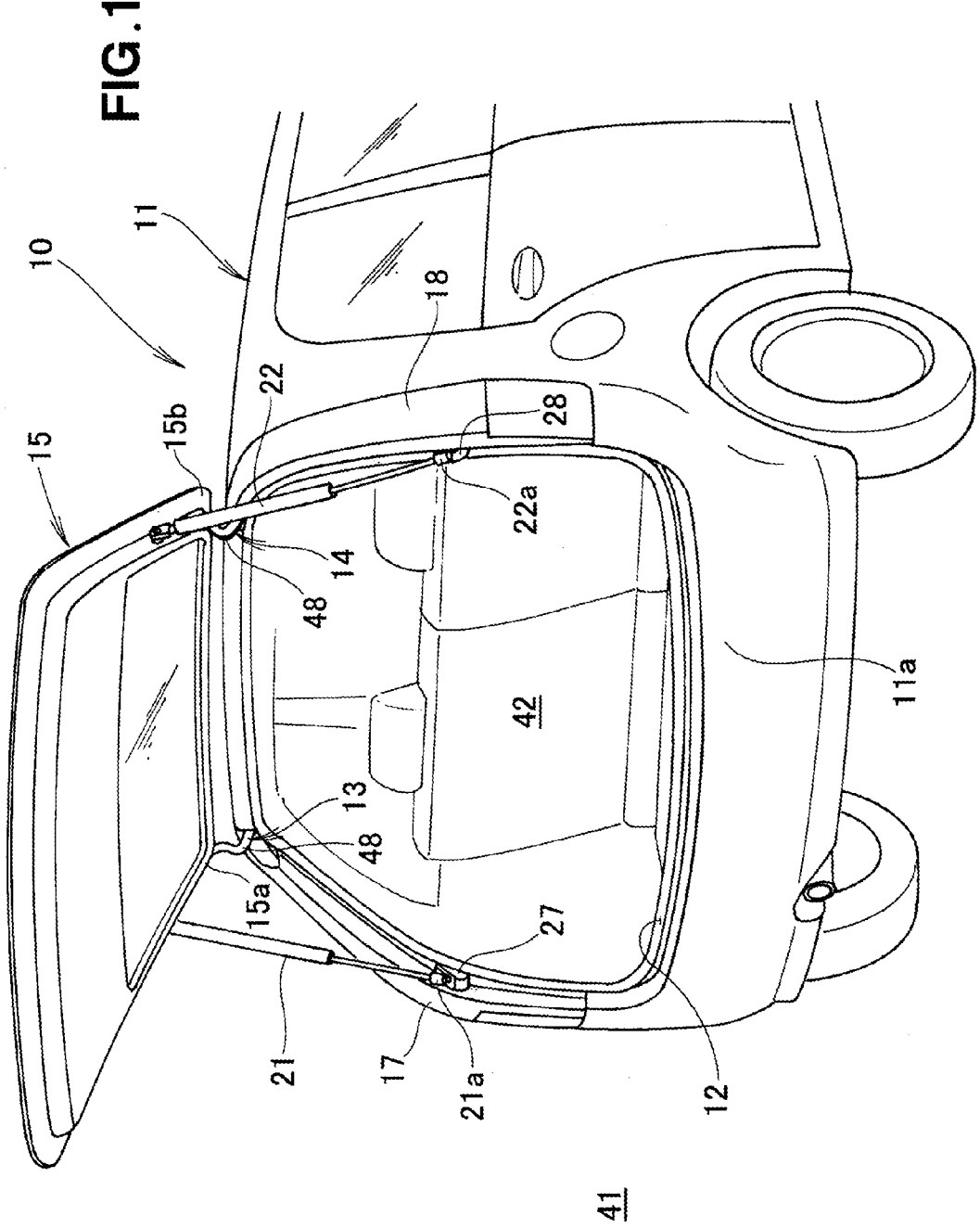
FIG. 1 is a perspective view of a vehicle provided with a rear vehicle body structure according to a preferred embodiment of the present invention.

Now, preferred embodiments of the present invention will be described hereinbelow with reference to the accompanying drawings. In the drawings, reference characters "Fr", "Rr", L and "R" indicate forward, rearward, leftward and rightward directions of a vehicle body.

Embodiment

Figure 2:
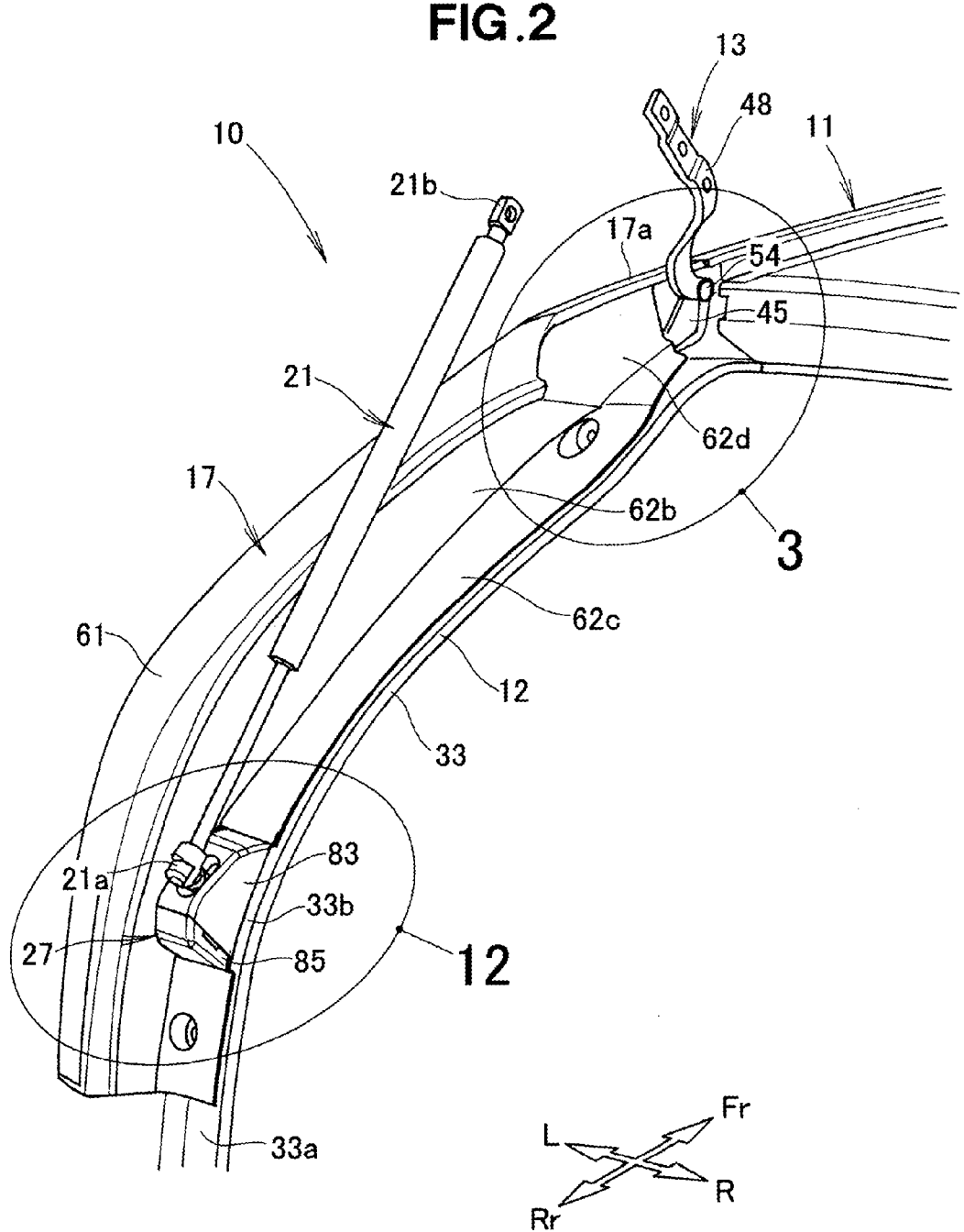
FIG. 2 is a perspective view of a left hinge member and a left stay shown in FIG. 1.

As shown in FIGS. 1 and 2, a preferred embodiment of a rear vehicle body structure 10 includes: an opening section 12 provided in a rear section 11a of a vehicle body 11; left and right hinge members 13 and 14 provided near the opening section 12; a tailgate 15 connected to the left and right hinge members 13 and 14; and left and right rear combination lamps (lighting members) 17 and 18.

Figure 14:
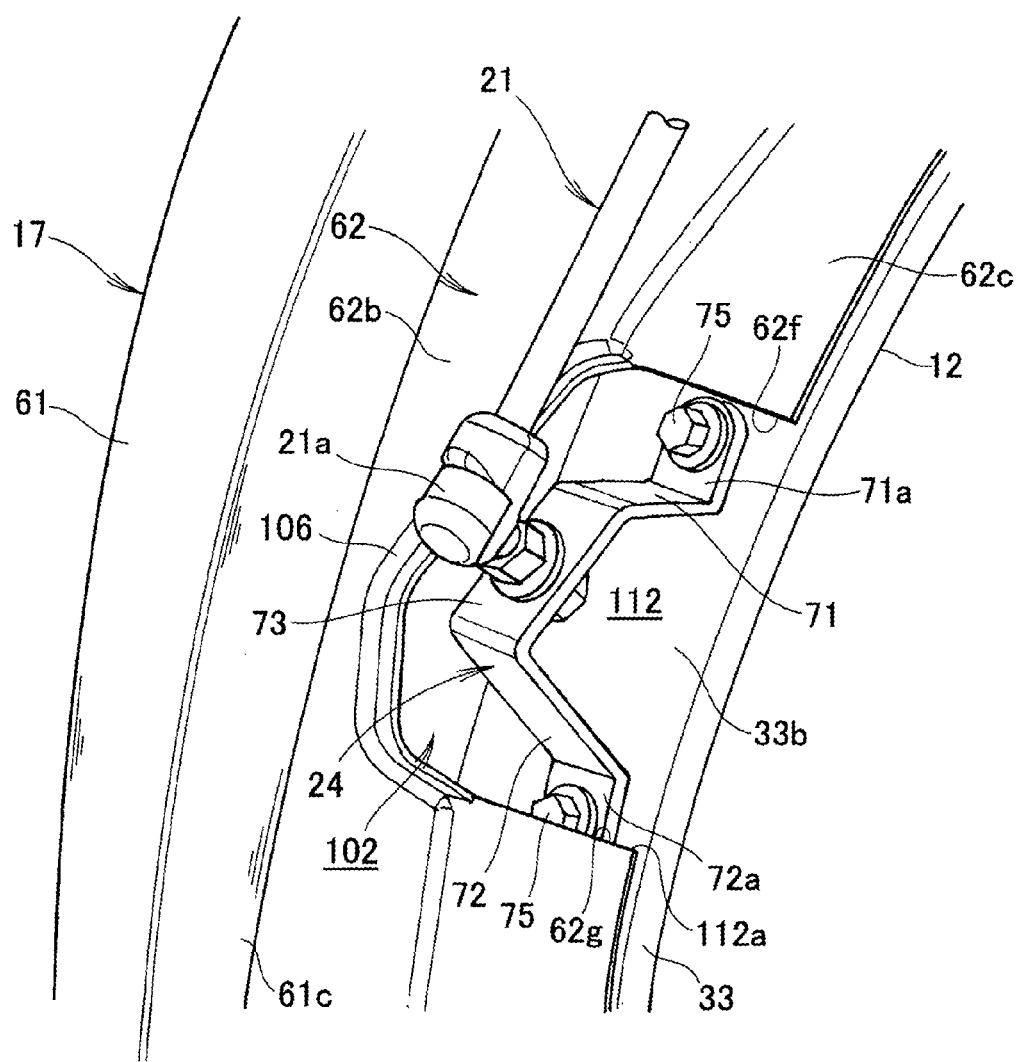
FIG. 14 is a perspective view showing the left stay support structure of FIG. 12 with a stay cover removed.

The rear vehicle body structure 10 further includes: left and right stays 21 and 22 supporting the tailgate 15, left and right mounting bases 24 (FIG. 14) to which are connected lower end portions 21a and 22a of the left and right stays 21 and 22; and left and right stay covers 27 and 28 covering the left and right mounting bases 24. In FIG. 14, only the left mounting base 24 is shown with illustration of the right mounting base omitted.

Because the left and right hinge members 13 and 14, left and right rear combination lamps 17 and 18, left and right stays 21 and 22 and left and right stay covers 27 and 28 are provided on the left and right sides of the rear vehicle body structure 10 in left-right symmetry, the following describe in detail only the left-side component members, using same reference numerals for the left and right component members.

Figure 3:
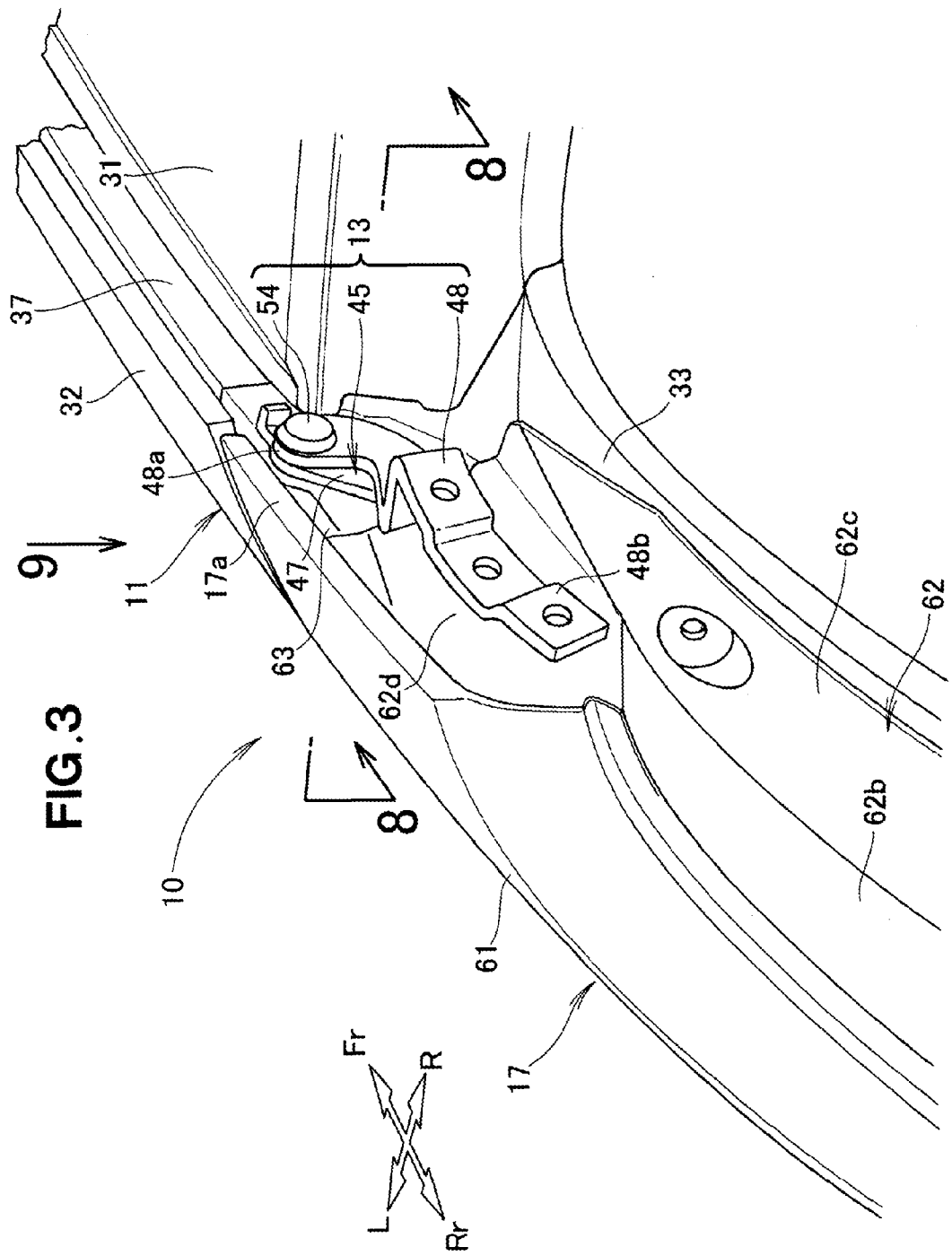
FIG. 3 is an enlarged view of a region encircled at 3 in FIG. 2.
Figure 4:
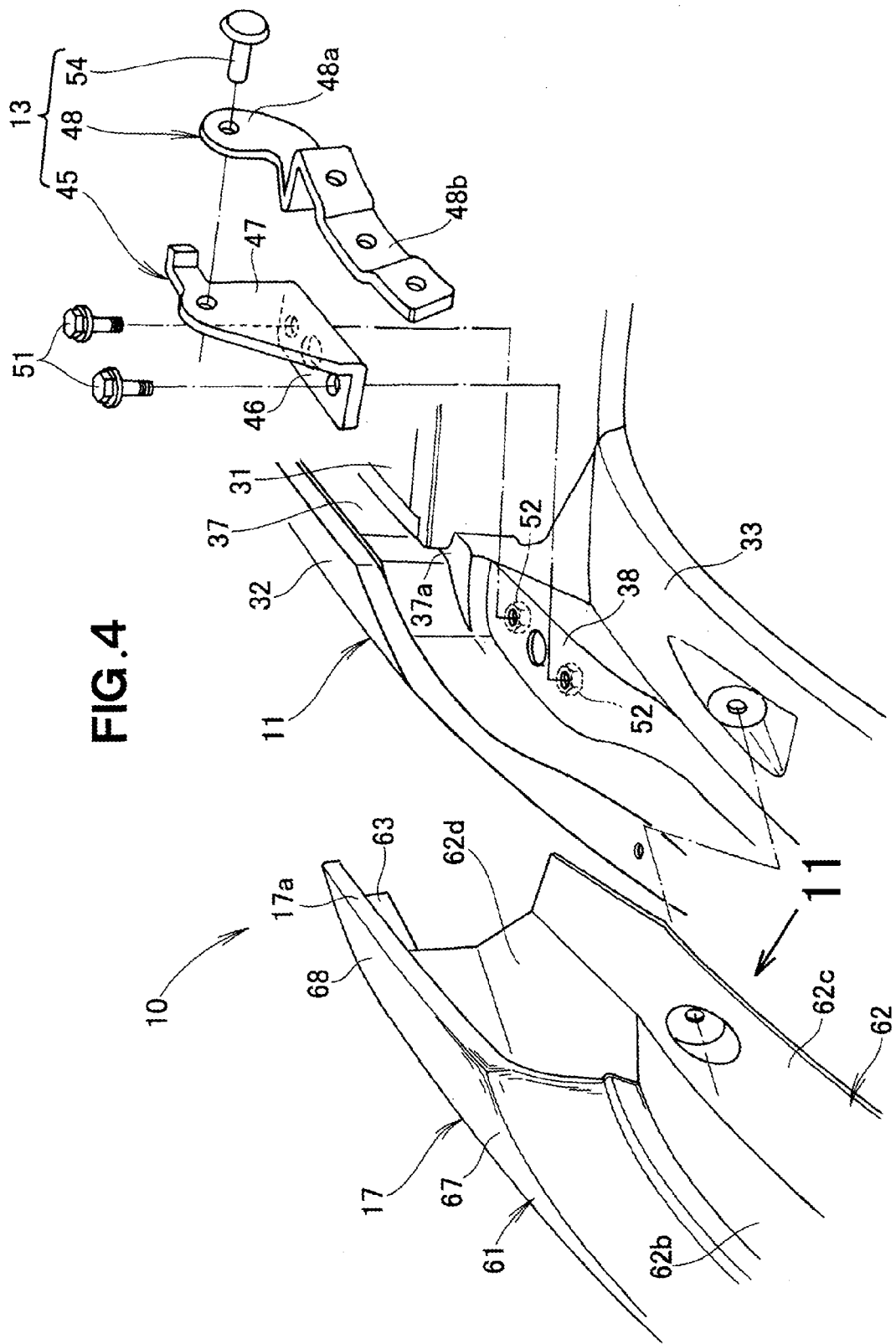
FIG. 4 is an exploded perspective view of the left hinge member shown in FIG. 3.

Further, as shown in FIGS. 3 and 4, the vehicle body 11 includes: a roof panel 31 provided on a ceiling section; a side panel 32 provided on a side section; a rear outer panel 33 provided on the rear section; a rear inner panel 34 (FIG. 7) provided on the rear outer panel 33; and a reinforcing member 35 (FIG. 7) provided on the rear inner panel 34.

Further, as shown in FIG. 5, the roof panel 31 has a left-side stepped portion 31a formed in and along a left side edge thereof. The side panel 32 has an upper stepped portion 32a in and along an upper edge thereof. A roof groove portion (Mohican groove portion) 37 is formed by the upper stepped portion 32a of the side panel 32 being joined to the left-side stepped portion 31a of the roof panel 31 in horizontally superposed relation to the latter. The roof groove portion 37 is formed to extend in a front-rear direction of the vehicle body along the left side edge of the roof panel 31 and the upper edge of the side panel 32.

The rear outer panel 33 is fixedly joined to the side panel 32 and the roof panel 31. Namely, the rear outer panel 33 is provided on the rear section of the vehicle body 11 by being fixedly joined to the side panel 32 and the roof panel 31. The rear outer panel 33 has the opening section 12 (see also FIG. 1) formed in a central region of the rear outer panel 33, and left and right hinge mounting sections 38 formed on left and right side portions of the opening section 12. Because the left and right hinge mounting sections 38 are arranged and constructed in left-right symmetric relation to each other, the following describe only the left hinge mounting section 38 with a description about the right hinge mounting section 38 omitted.

Further, as shown in FIG. 1, the opening section 12 is formed in the rear section of the vehicle body 11 so as to face the outside 41 of the vehicle body 11. Baggage or the like is loaded from the outside 41 of the vehicle body 11, through the opening section 12, into a baggage room 42.

Further, as shown in FIG. 5, an outer side, facing toward the outside of the vehicle body, of the hinge mounting section 38 is formed in an inwardly concaved shape, and the left hinge mounting section 38 is provided continuously with a rear end part 37a of the roof groove portion 37. The left hinge member 13 (FIG. 3) is mounted on the left hinge mounting section 38.

The left hinge mounting section 38 can have an increased strength by virtue of the above-mentioned inwardly concaved shape. In this way, the left hinge member 13 can be firmly fixed to the left hinge mounting section 38, and thus, the tailgate 15 (FIG. 1) can be firmly mounted on the rear section (i.e., on the rear outer panel 33) of the vehicle body 11.

The roof groove portion 37 is a donwardly recessed groove portion extending in the front-rear direction of the vehicle body and has a high strength. Thus, with the left hinge mounting section 38 provided continuously with the rear end part 37a of the roof groove portion 37, the strength of the left hinge mounting section 38 can be even further increased, so that the left hinge member 13 can be mounted on the left hinge mounting section 38 even more firmly. Details of the left hinge member 13 will be discussed later.

Figure 6:
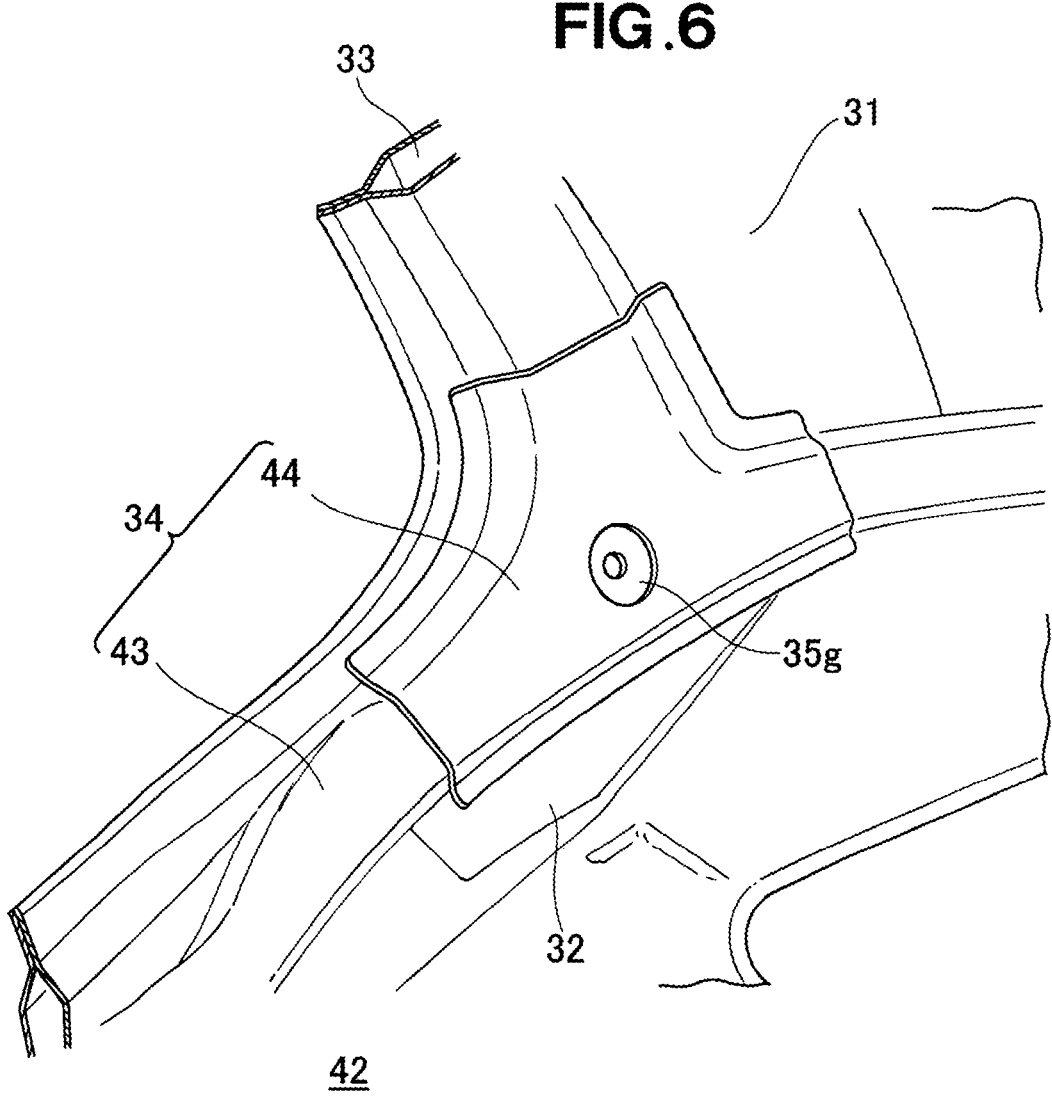
FIG. 6 is a view taken in a direction of arrow 6 in FIG. 5.
Figure 7:
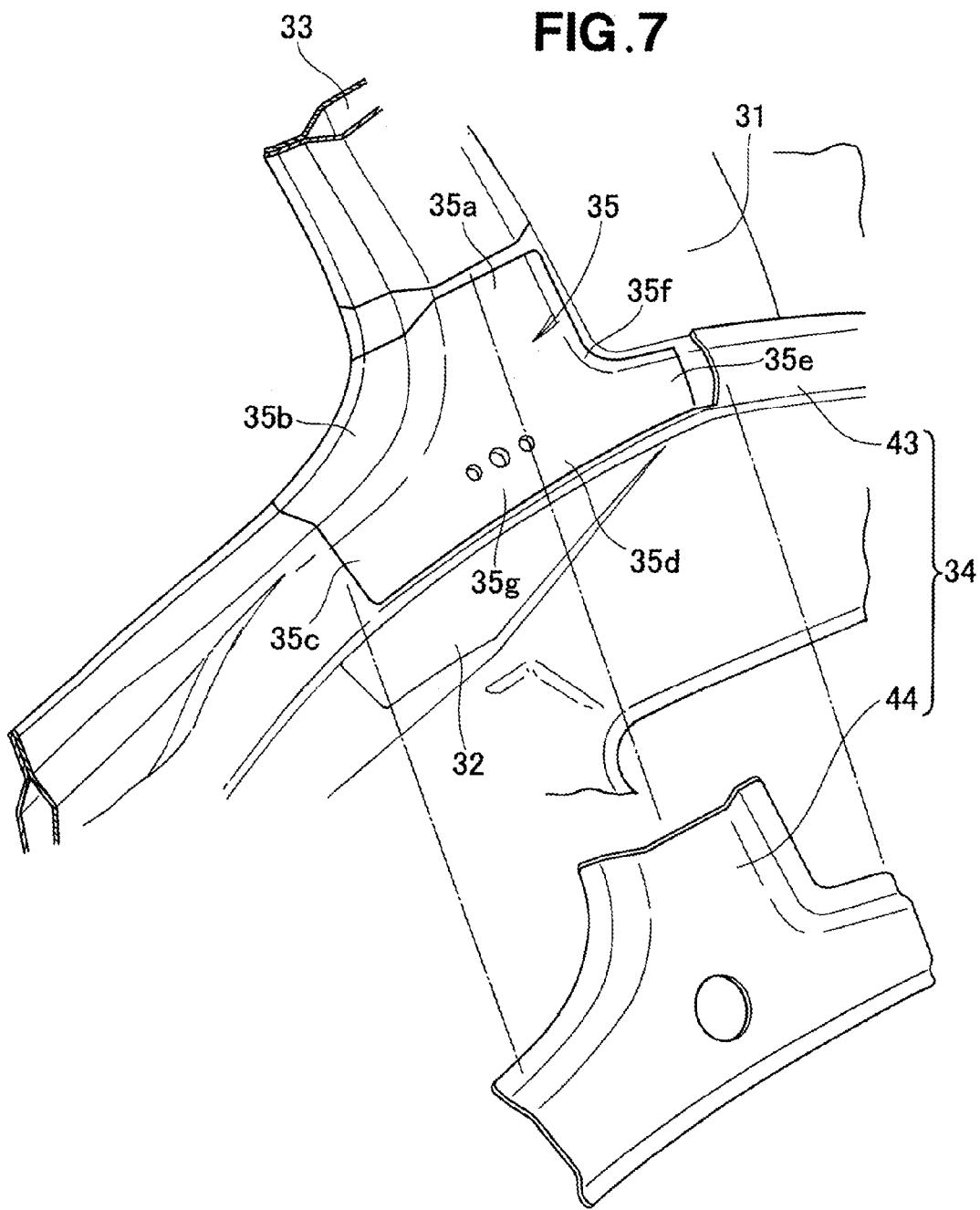
FIG. 7 is an exploded perspective view corresponding to FIG. 6.

Further, as shown in FIGS. 6 and 7, the rear inner panel 34 is mounted on the rear outer panel 33 from the interior of the baggage compartment 42 (i.e., from the interior of the vehicle body). Namely, the rear inner panel 34 is mounted on a side of the rear outer panel 33 closer to the baggage compartment 42. The rear inner panel 34 comprises a main inner panel 43 and a sub inner panel 44.

The reinforcing member 35 is provided at a position, corresponding to the left hinge position 38 (FIG. 5), between the rear outer panel 33 and the rear inner panel 34. The reinforcing member 35 is joined to the rear inner panel 34, roof panel 31 and side panel 32.

More specifically, the reinforcing member 35 is joined (welded) at first to third peripheral portions 35a, 35b and 35c to the rear inner panel 34. Further, the second peripheral portion 35b of the reinforcing member 35 is joined (welded) to the rear outer panel 33, and fifth and sixth peripheral portions 35b and 35b of the reinforcing member 35 are joined (welded) to the side panel 32.

Figure 8:
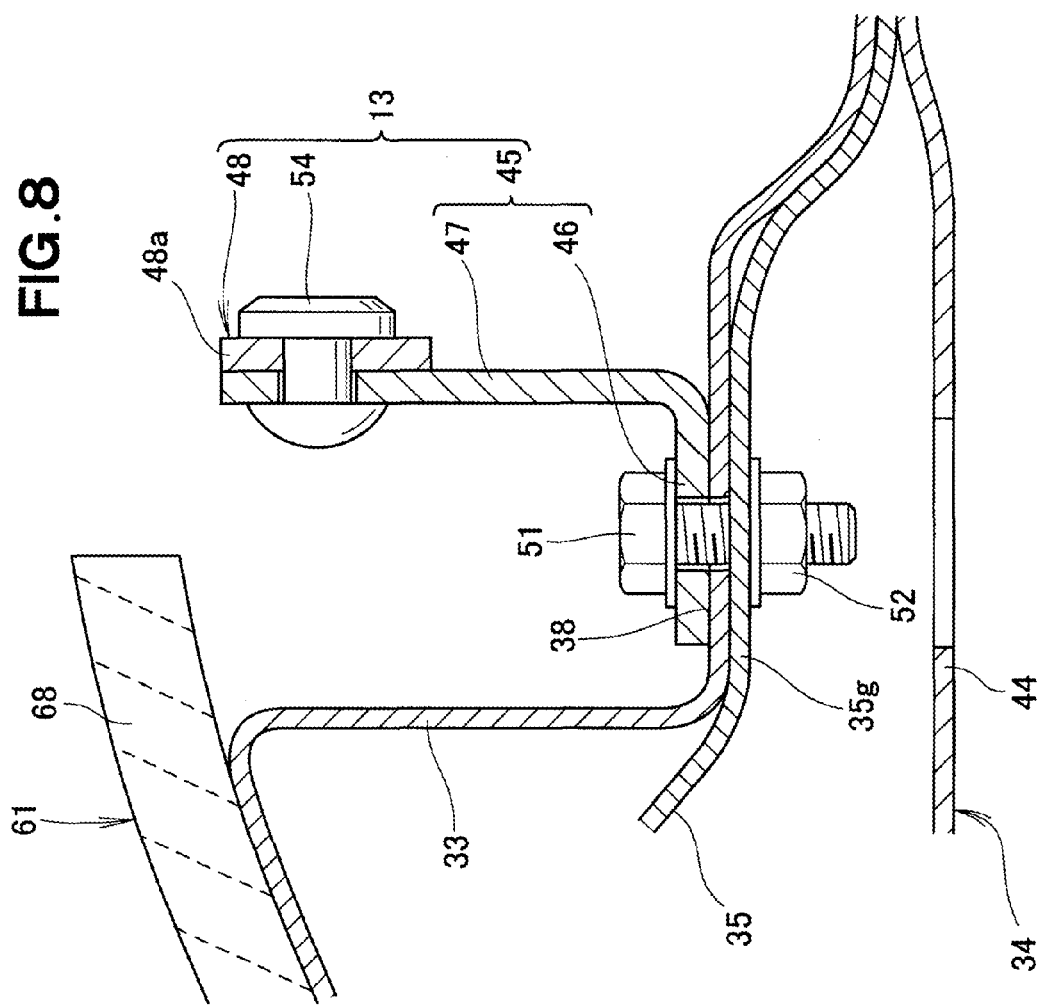
FIG. 8 is an enlarged sectional view taken along line 8-8 in FIG. 3.

Further, a seventh peripheral portion 35f of the reinforcing member 35 is joined (welded) to the roof panel 31. The reinforcing member 35 has a hinge mounting portion 35g on which is mounted a vehicle-body-side hinge section 45 via the left hinge mounting section 38 of the rear outer panel 33 as shown in FIG. 8.

Further, as shown in FIGS. 6 and 7, the first to seventh peripheral portions 35a to 35f of the reinforcing member 35 are joined (welded) to the individual panels 31, 32 and 34. Namely, the left hinge mounting section 38 can reinforced with the reinforcing member 35 by the reinforcing member 35 being joined to the panels 31, 32 and 34.

The left hinge mounting section 38 reinforced by the reinforcing member 35 as above can even further increase the strength of the left hinge mounting section 38. In this way, the left hinge member 13 (FIG. 4) can be even more firmly fixed to the left hinge mounting section 38.

Further, as shown in FIGS. 3 and 4, the left hinge member 13 is fixedly mounted on the left hinge mounting section 38. The left hinge member 13 includes: a vehicle-body-side hinge section 45 fixed to the left hinge mounting section 38; the door-side hinge section 48 connected to the vehicle-body-side hinge section 45; and a support pin 54 pivotably supporting the door-side hinge section 48 on the vehicle-body-side hinge section 45.

The above-mentioned vehicle-body-side hinge section 45 includes a fixed portion 46 fixed to the left hinge mounting section 38, and a support portion 47 projecting upward from the fixed portion 46 toward the outside of the vehicle body.

Further, as shown in FIG. 8, the fixed portion 46 has a substantially rectangular shape (FIG. 10) and is fastened to the rear outer panel 33 and the reinforcing member 35 by means of a bolt 51 and a nut 52. More specifically, the fixed portion 46 is fastened to the left hinge mounting section 38 of the rear outer panel 33 by means of the bolt 51 and the nut 52.

Figure 9:
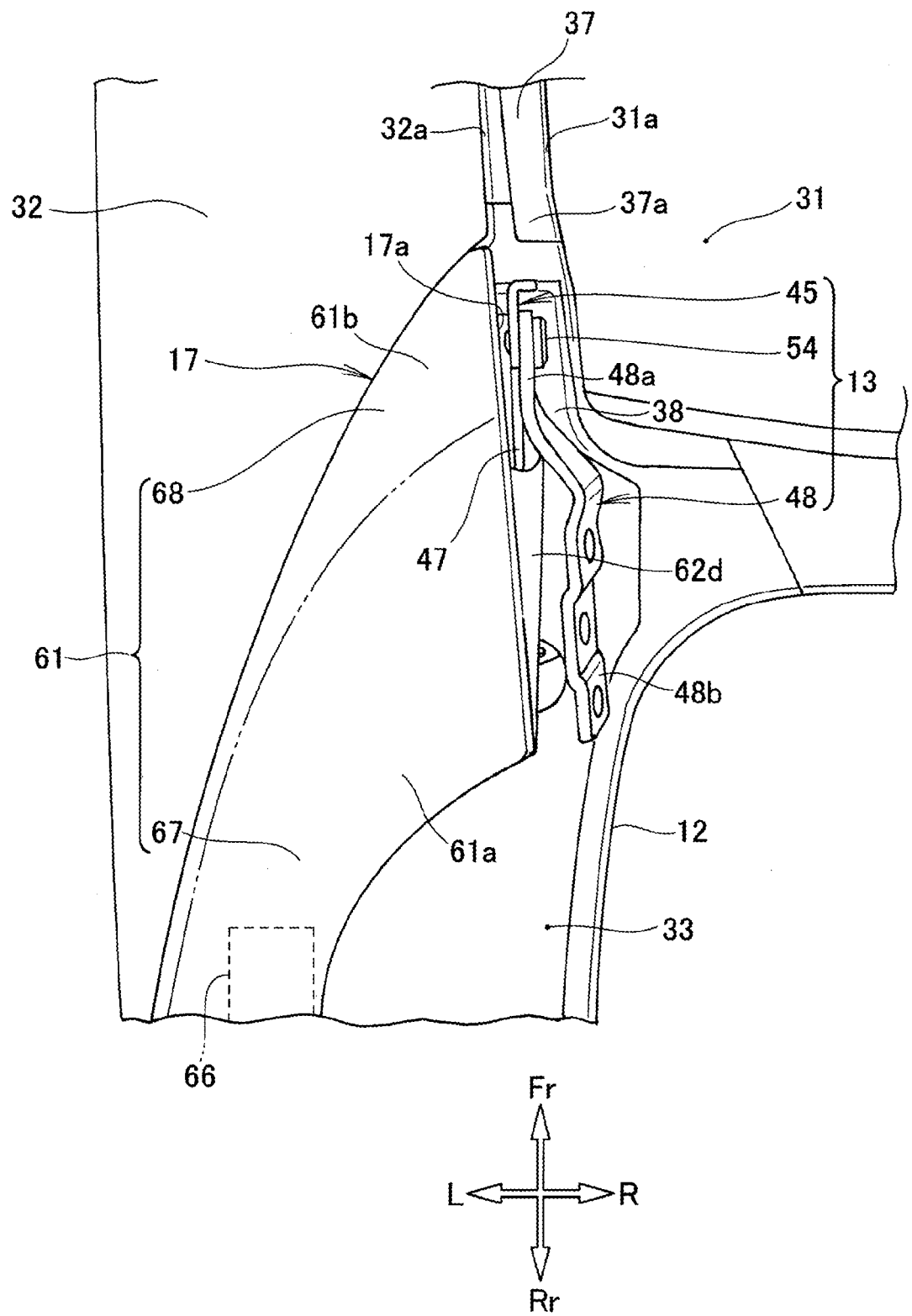
FIG. 9 is a view taken in the direction of arrow 9 of FIG. 3.

As shown in FIGS. 9 and 10, the fixed portion 46 has a substantially rectangular shape and is fastened to the left hinge mounting section 38 by means of the bolt 51 and the nut 52 (see also FIG. 4 for the nut 52).

The support portion 47 projects rearward and upward (outward) from the fixed portion 46 (see also FIG. 4). The door-side hinge section 48 is pivotably supported at its one end portion 48a via the support pin 54. The support portion 47 is disposed along the inner side edge 17a of the left rear combination lamp 17.

The inner side edge 17a is an edge facing toward a middle part in the vehicle width direction (widthwise middle of the vehicle). The door-side hinge section 48 has one end portion 48 abutted against the support portion 47 from a side opposite from the inner side edge 17a. Further, the abutted one end portion 48 is pivotably supported on the support portion 47 by means of the support pin 54. The support pin 54 is inserted through the one end portion 48a and the support portion 47 from the side opposite from the inner side edge 17a.

With the door-side hinge section 48 supported on the support portion 47 from the side opposite from the inner side edge 17a as noted above, the support portion 47 can be disposed adjacent to the inner side edge 17a of the left rear combination lamp 17. Thus, it is possible to increase a range over which the support section 47 (i.e., vehicle-body-side hinge section 45) is covered with the left rear combination lamp 17. In this way, it is possible to secure an improved outer appearance of the rear section of the vehicle body 11.

The door-side hinge section 48 is pivotably connected at the one end portion 48a to the support section 47 via the support pin 54 and mounted at another end portion 48b on an upper left end portion (upper end portion) 15a (FIG. 1) by means of a bolt (not shown). Similarly, the door-side hinge section 48 of the right hinge member 14 shown in FIG. 1 is mounted on an upper right end portion of the tailgate 15 by means of a bolt (not shown).

Further, as shown in FIG. 1, the upper left end portion 15*a* of the tailgate 15 is pivotably supported by the left hinge member 13, while the upper right end portion 15*b* of the tailgate 15 is pivotably supported by the right hinge member 14. Further, the left hinge member 13 is fixedly mounted on the left hinge mounting section 38 (FIG. 4) of the rear outer panel 33, while the right hinge member 14 is fixedly mounted on the right hinge mounting section of the rear outer panel 33.

In the aforementioned manner, the tailgate 15 is pivotably supported at its upper left end portion 15*a* and upper right end portion 15*b* on the rear outer panel 33 via the left and right hinge members 13 and 14. The opening section 12 of the rear outer panel 33 can be opened and closed by the tailgate 15 pivoting vertically (in an up-down direction) about the left and right hinge members 13 and 14.

Further, as shown in FIG. 9, the door-side hinge section 48 is supported on the support section 47 from the side opposite from the inner side edge 17*a*. Thus, there is no possibility that pivoting movement of the door-side hinge section 48 is disturbed or prevented by the inner side edge 17*a*. In this manner, it is possible to secure an optimal pivoting range of the door-side hinge section 48 so that the tailgate 15 shown in FIG. 1 can be opened to an easy-to-use position.

Further, as shown in FIGS. 3 and 4, the left rear combination lamp 17 is provided on the left side, in the vehicle width direction, of the tail gate 15. The left rear combination lamp 17 comprises an integral combination of a brake lamp, a winker lamp, a back lamp, a tail lamp, etc. The left rear combination lamp 17 is provided on the rear outer panel (outer surface of the vehicle body) 33 in such a manner as to cover the vehicle-body-side hinge section 45 from an outer lateral side (outside) of the vehicle body. In this manner, the vehicle-body-side hinge section 45 can be covered with the left rear combination lamp 17. Thus, when the tailgate 15 is in the opening position, the vehicle-body-side hinge section 45 can be made hardly seen from the rear outside of the vehicle body 11, so that an improved outer appearance of the vehicle can be secured.

Further, because the vehicle-body-side hinge section 45 is covered with the left rear combination lamp 17, it is not necessary to provide a separate dedicated member for covering the vehicle-body-side hinge section 45, which can thereby reduce the number of necessary component parts and hence the necessary cost.

Figure 11:
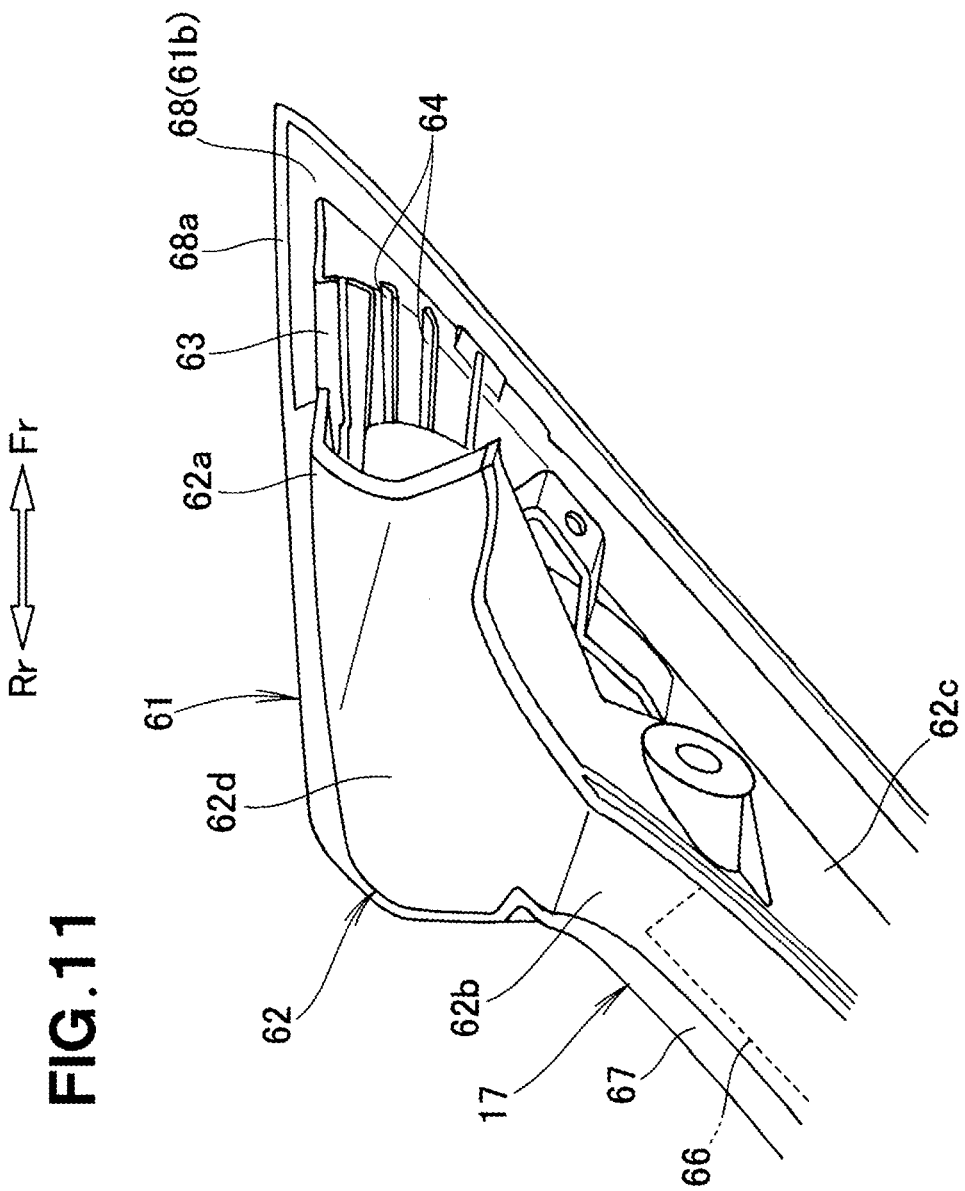
FIG. 11 is a view showing the left rear combination lamp of FIG. 4 in the direction of arrow 11.

The left rear combination lamp 17 includes: a lens section (surface section) 61; a housing section 62 provided inward of the lens section 61; a housing extension portion 63 extending from the housing section 62; and a plurality of reinforcing ribs 64 provided on the housing extension portion 63 (FIG. 11).

As shown in FIG. 9, the lens section 61 includes a transparent section 67 for transmitting therethrough light from a light source 66 provided inside the housing section 62, and an opaque section 68 for reflecting light coming from the outside or external light.

The transparent section 67 is provided in a main part 61*a* of the lens section 61. The transparent section 67 is a lens that scatters light from the light source 66 so that the scattered light is transmitted to the outside 41 of the vehicle body 11.

The opaque section 68 is provided in an edge portion 61*b* of the lens section 61 to cover the vehicle-body-side hinge section 45 from the outside of the vehicle body. Namely, the vehicle-body-side hinge section 45 is covered with the opaque section 68 provided in the edge portion 61*b* of the lens section 61. Thus, the left hinge member 13 (particularly the vehicle-body-side hinge section 45) can be effectively covered with the left rear combination lamp 17, with the result that an improved outer appearance of the rear section of the vehicle body can be secured.

As shown in FIG. 11, the housing section 62 is provided inside the lens section 61 (transparent section 67). The housing section 62 has an accommodating portion of a recessed shape opposed to the housing section, and the light source 66 provided in the accommodating portion.

The light source 66 is provided opposed to the transparent section 67. Thus, light emitted from the light source 66 can be scattered through the transparent section 67, and such scattered light can be transmitted to the outside 41 of the vehicle body 11. Details of the housing section 62 will be discussed later.

The housing extension portion 63 is provided inward of the edge portion 61*b* of the lens section 61 (i.e., opaque section 68 (see also FIG. 9)). The housing extension portion 63 projects from an end portion 62*a* of the housing section 62 toward the edge portion 61*b* (opaque section 68). Thus, the opaque section 68 can be reinforced (supported) by the housing extension portion 63, so that a sufficient strength of the opaque section 68 can be secured.

The housing extension portion 63 has a plurality of reinforcing ribs 64 integrally formed therewith. The plurality of reinforcing ribs 64 extend in the same extending direction as the housing extension portion 63 at predetermined intervals in a direction intersecting the extending direction of the housing extension portion 63 (front-rear direction of the vehicle body)

With the reinforcing ribs 64 formed integrally with the housing extension portion 63 housing extension portion 63, it is possible to increase the strength of the housing extension portion 63. In this way, an optimal strength of the opaque section 68 can be secured by the housing extension portion 63 and the reinforcing ribs 64.

Further, as shown in FIGS. 1 and 2, the tailgate 15 is connected to the rear outer panel 33 via the left stay 21 etc. The left stay 21 is connected at its lower end portion 21*a* to a peripheral edge portion 33*a* of the rear outer panel 33 along the opening section 12 by means of the left mounting base 24. Further, the left stay 21 is connected at its upper end portion 21*b* to a portion of the tailgate 15 near the upper left end portion 15*a*.

The left stay 21, which supports the tailgate 15, expands and contracts in response to opening and closing movement, respectively, of the tailgate 15. With the tailgate 15 supported by the left stay 21, the tailgate 15 can stay in balance against its own weight as it is opened. Because the tailgate 15 can stay in balance against its own weight by means of the left stay 21, it can be opened smoothly.

Figure 12:
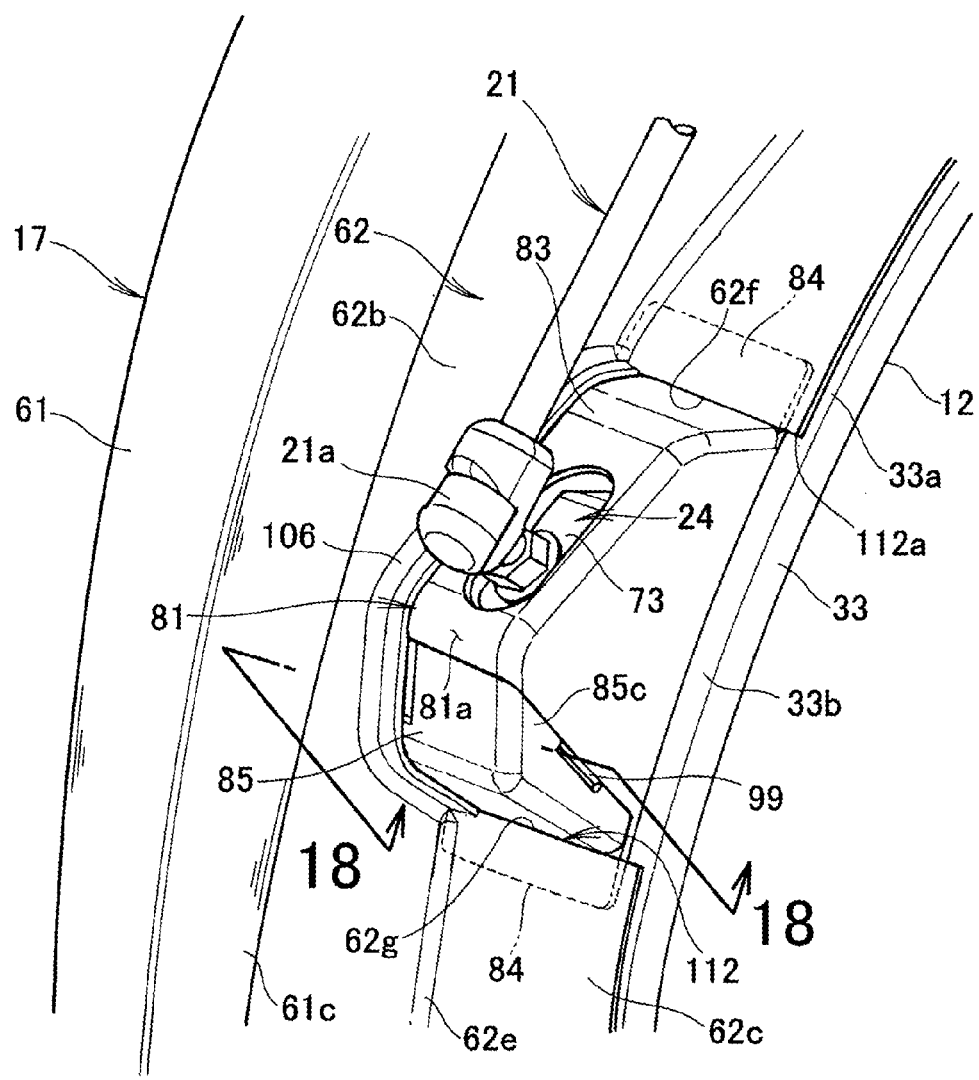
FIG. 12 is an enlarged view of a region encircled at 12 of FIG. 2.
Figure 13:
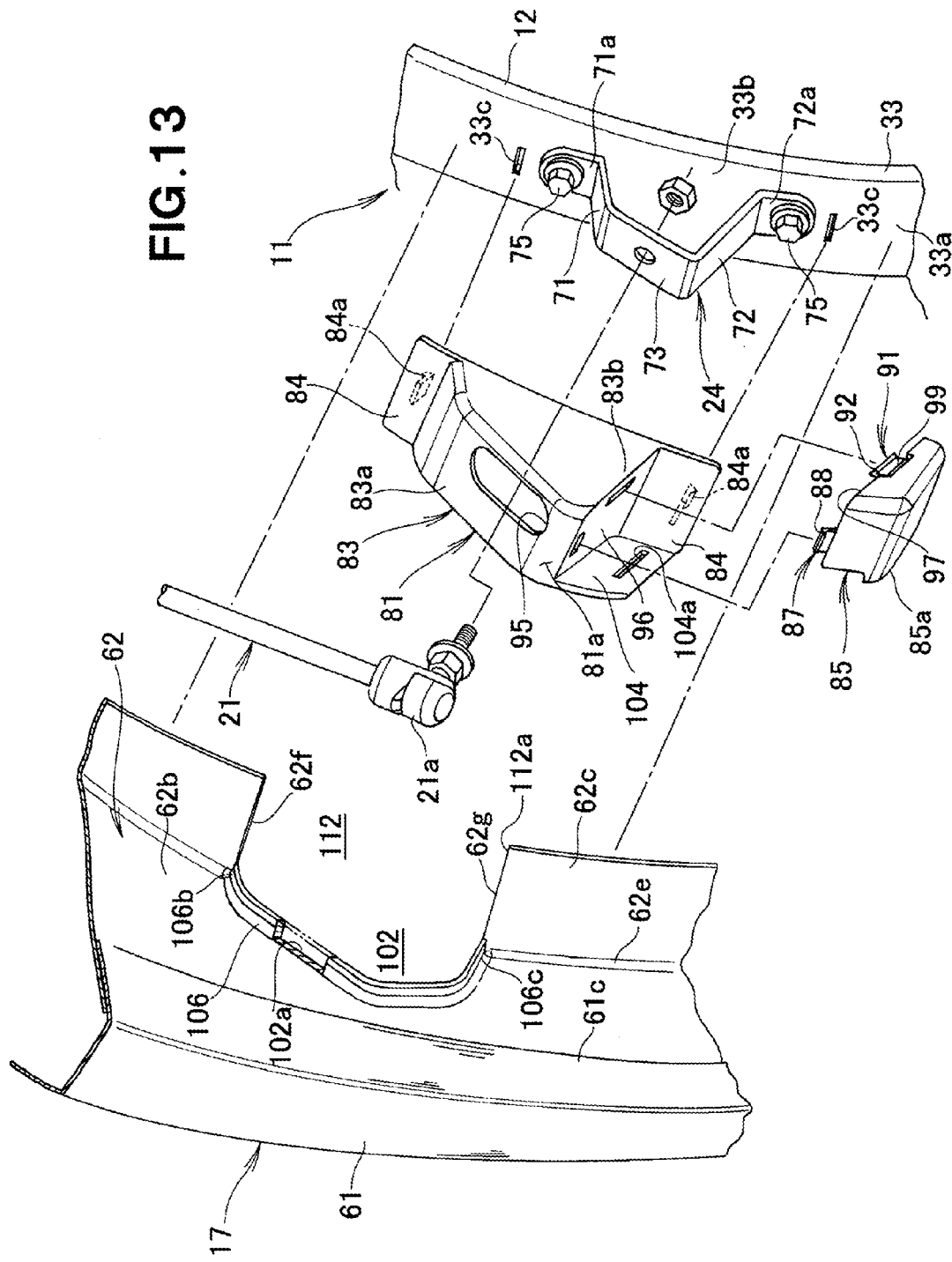
FIG. 13 is an exploded perspective view of a support structure for a left stay shown in FIG. 12.

Further, as shown in FIGS. 12 and 13, the left mounting base 24 has a pair of leg portions 71 and 72 fastened to a stay mounting part 33*b* of the peripheral edge portion 33*a*, and a seat portion 73 provided between the respective top ends of the leg portions 71 and 72. The left mounting base 24 is accommodated in a cover body 83.

A mounting part 71*a* of one of the leg portions 71 is fastened to the mounting part 33*b* by means of a bolt 75 and a nut (not shown). Similarly, a mounting part 72*a* of the other leg portion 72 is fastened to the mounting part 33*b* by means of a bolt 75 and a nut (not shown). Thus, the seat portion 73 is mounted on the mounting part 33*b* via the pair of leg portions 71 and 72 in spaced-apart relation to the mounting part 33*b*.

With the seat portion 73 spaced from the mounting part 33*b* as above, the seat portion 73 is located outward (rearward) of a housing mounting portion 62*c* of the housing section 62. The left stay 21 is connected at the lower end portion 21*a* to the seat portion 73. The lower end portion 21a of the left stay 21 is connected to the seat portion 73 in such a manner that it is pivotable in desired directions.

With the lower end portion 21a of the left stay 21 connected to the seat portion 73 as above, the left stay 21 can be spaced from the mounting part 33b of the peripheral edge portion 33a. In this way, it is possible to enhance a degree of design freedom in determining a mounting angle and pivoting angle of the left stay 21.

The left mounting base 24 is accommodated in the cover body 83, so that the left mounting base 24 is located above a cover cap 85. The reason why the left mounting base 24 is provided above the cover cap 85 will be described later.

Further, as shown in FIGS. 12 and 13, the left mounting base 24 is covered with a stay cover 81. The stay cover 81 bulges in a rearward direction of the vehicle body so that it has a mountain-shaped bulging surface (contour) 81a.

The stay cover 81 comprises the cover body 83 fastened to the mounting portion 33b of the peripheral edge portion 33a, and the cover cap 85 detachably attached to the cover body 83. The cover cap 85 has first and second locking portions 87 and 91 that detachably attach the cover cap 85 to the cover body 83. Namely, the stay cover 81 is divided in two parts, i.e. the cover body 83 and the cover cap 85.

The cover body 83 is provided on the mounting part 33b of the peripheral edge portion 33a and formed so as to accommodate therein the lower end portion 21a. Thus, the cover body 83 provided on the mounting part 33b of the peripheral edge portion 33a covers the mounting part 33b and the lower end portion 21a of the left stay 21.

The cover body 83 is mounted on the mounting part 33b by upper and lower mounting claw portions 84a being engaged in locking holes 33c of the mounting part 33b. The upper mounting claw portion 84a is provided integrally on the cover body 84 via an upper mounting part 84, and the lower mounting claw portion 84a is provided integrally on the cover body 83 via a lower mounting part 84. The upper and lower mounting parts 84 are held abutted against the mounting part 33b of the rear outer panel 33.

Further, the cover body 83 has a through-hole 95 formed in its upper portion 83a, an engaging portion 96 provided on its lower portion (lower side of the cover body 83) 83b, and an abutting portion 104 that supports the cover cap 85. By being accommodated in the cover body 83, the lower end portion 21a of the left stay 21 is covered with the cover body 83.

More specifically, the lower end portion 21a of the left stay 21 is inserted through the through-hole 95 to project in a rear upper (outward) direction of the vehicle body 11. Further, with the body's engaging portion 96 provided on the lower portion 83b of the cover body 83, an engaging portion 97 of the cover cap 85 is detachably attached to the engaging portion 96 of the cover body 83. Thus, the cover cap 85 is detachably attached to the lower side of the cover body 83 opposite from the left stay 21.

Figure 15:
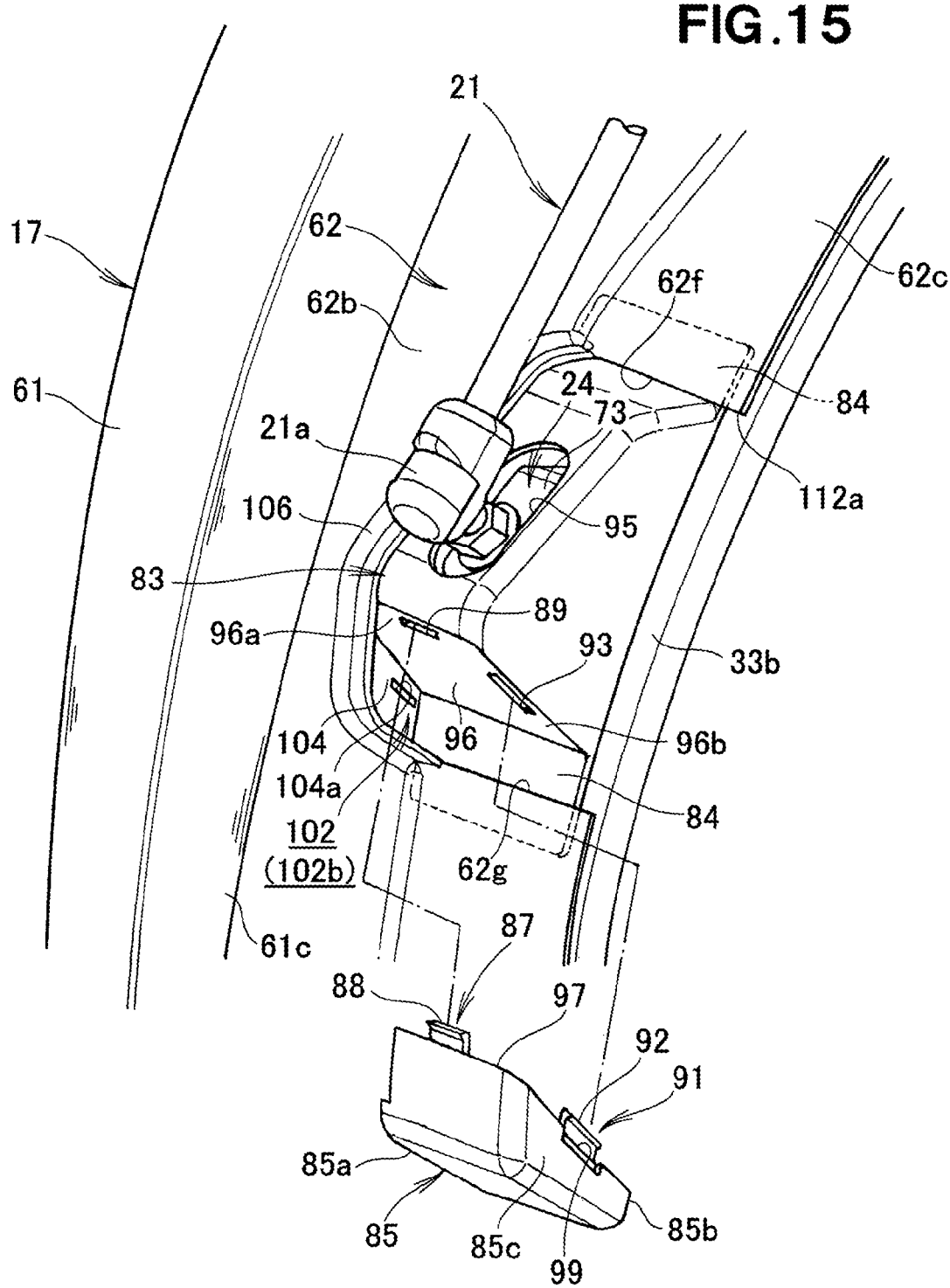
FIG. 15 is a perspective view showing the left stay support structure of FIG. 12 with a cover cap removed.

Further, as shown in FIG. 15, the cover cap 85 has an outer side portion 85a abuttingly engageable with the abutting portion 104 of the cover body 83 (see also FIG. 17), a base portion 85b abuttingly engageable with the mounting part 33b (more specifically, the lower mounting claw portion 84), and the engaging portion 97 abuttingly engageable with the engaging portion 96 of the cover body 83.

Further, as shown in FIGS. 16, 17 and 18, the cover cap 85 is formed so that a projecting part 85d of the cap's outer side portion 85a is insertable into an insertion hole 104a of the abutting portion 104 with the outer side portion 85a abutted against the abutting portion 104. Additionally, as shown in FIGS. 16 and 17, the cover cap 85 is detachably attached to the cover body 83 by means of the first and second locking portions 87 and 91 with the engaging portion 97 abutted against the body's engaging portion 96.

Further, as shown in FIGS. 15 and 16, the first locking portion 87 is a member that detachably supports an upper edge part (edge part) 97a on the cover body 83. The upper edge part 97a is an edge portion of the cap's engaging portion 97 extending upward away from the rear outer panel 33. The first locking portion 87 has a first locking claw 88 provided on the cap's engaging portion 97, and a first locking hole 89 provided in the engaging portion 96.

The first locking claw 88 has a first leg portion 88a projecting from the cap's engaging portion 97 toward the body's engaging portion 96, and a first claw portion 88b formed at the distal end of the first leg portion 88a to project outwardly. The first leg portion 88a is an elastically deformable portion projecting from the upper edge 97a of the cap's engaging portion 97.

The first locking hole 89 is formed in an upper edge part 96a of the body's engaging portion 96 so as to engage with the first locking claw 88. The upper edge part 96a is an edge part of the body's engaging portion 96 extending upward away from the rear outer panel 33. The first claw 88 is inserted into the first locking hole 89 with the base portion 85b of the cover cap 85 abutted against the rear outer panel 33 (more specifically, the upper mounting part 84), so that the first claw portion 88b passes through the first locking hole 89 to engage with the upper edge part 96a.

Further, as shown in FIGS. 15 and 17, the second locking portion 91 is a member that detachably supports an inner edge part (edge part) 97b on the cover body 83. The inner edge part 97b is an edge part of the cap's engaging portion 97 extending toward the widthwise middle of the vehicle body away from a housing's opening portion 102 (abutting portion 104). The second locking portion 91 has a second locking claw 92 provided on the cap's engaging portion 97, and a second locking hole 93 provided in the engaging portion 96.

The second locking claw 92 has a second leg portion 92a projecting from the cap's engaging portion 97 toward the body's engaging portion 96, and a second claw portion 92b formed at the distal end of the second leg portion 92a to project toward the widthwise middle of the vehicle body. The second leg portion 92a is an elastically deformable portion projecting from the inner edge 97b of the cap's engaging portion 97.

The second locking hole 93 is formed in an inner edge part 96b of the body's engaging portion 96 so that the second locking claw 92 is engageable therein. The inner edge part 96b is an edge part of the body's engaging portion 96 extending toward the widthwise middle of the vehicle body away from the housing's opening portion 102 (abutting portion 104).

The second claw 92 is inserted into the second locking hole 93 with the outer side portion 85a of the cover cap 85 abutted against the abutting portion 104, so that the second claw portion 92b passes through the second locking hole 93 to engage with the inner edge part 96b. In this state, the base portion 85b of the cover cap 85 is inserted in the insertion hole 104a of the abutting portion 104.

Further, as shown in FIGS. 15 to 17, the cover cap 85 is abuttingly engageable with the abutting portion 104 and the upper mounting part 84. Additionally, using the first locking portion 87, the upper edge part 97a of the cap's engaging portion 97 is detachably/attachably supported on the inner edge part 96b of the engaging portion 96. In this way, the cover cap 85 can be reliably mounted by means of the abutting portion 104, upper mounting part 84 and first and second locking portions 87 and 91.

Further, the cover cap 85 is attachable and detachable to and from the cover body 83 by the two portions, i.e. the first and second locking portions 87 and 91, being merely engaged and disengaged. In this way, operations for attaching and detaching the cover cap 85 can be facilitated, and thus, the left rear combination lamp 17 can be detached with an enhanced operability.

Further, as shown in FIG. 12, the cover cap 85 has a stepped portion 99 of a recessed shape formed in a cap's inner side wall 85c. Thus, the cover cap 85 can be readily detached from the cover body 83 by a human operator or the like applying a detaching force to the stepped portion 99 in a rearward direction of the vehicle body.

Further, in the left rear combination lamp 17, as shown in FIGS. 12 and 13, the housing section 62 is mounted at the housing mounting portion 62c on the peripheral edge portion 33a of the rear outer panel 33.

The housing section 62 includes a side wall 62b protruding from an inner side portion 61c of the lens section 61 toward the peripheral edge portion 33a, and the housing mounting portion 62c protruding from an end of the side wall 62b toward the widthwise middle of the vehicle along the peripheral edge portion 33a. The side wall 62b and the mounting portion 62c are formed in a substantially L sectional shape as a whole.

As shown in FIGS. 3 and 9, the side wall 62b of the housing section 62 (housing side wall 62b) has an upper end portion 62d located along the other end portion 48b of the door-side hinge section 48. Also, the upper end portion 62d is located laterally outward, in the vehicle width direction, of the other end portion 48b of the door-side hinge section 48. Thus, the other end portion 48b of the door-side hinge section 48 can be covered with the upper end portion 62d from outside in the vehicle width direction.

Further, as shown in FIGS. 12 and 13, the side wall 62b of the housing portion 62 has: an opening (housing opening portion) 102 with which a bulging surface 81a of the stay cover 81 is fittingly engageable; the abutting portion 104 provided laterally outward, in the vehicle width direction, of the opening 102; and a flange portion 106 projecting from a peripheral edge 102a of the housing opening portion 102 toward the widthwise middle of the vehicle.

The housing opening portion 102 is an opening of a concavely recessed shape formed in the side wall 62b. The peripheral edge 102a of the housing opening portion 102 is formed to correspond in shape to the bulging surface 81a of the stay cover 81, so that the bulging surface 81a (more specifically, an outer portion, in the vehicle width direction, of the surface 81a) is fittable in the opening 102.

With the bulging surface 81a of the stay cover 81 fitted in the opening 102, the opening 102 can be closed with the stay cover 81. Thus, when the tailgate 15 (FIG. 1) is in the opening position, the opening 102 can be made hardly seen from the rear outside of the vehicle body 11, so that an improved outer appearance of the vehicle can be secured.

As noted above, the stay cover 81 is divided in the cover body 83 and the cover cap 85, and the cover cap 85 is detachably attached to the cover body 83. Thus, as shown in FIG. 15, a part 102b of the opening 102 can be opened by detachment of the cover cap 85 from the cover body 83.

The part 102b of the opening 102 opened as above can be used as a finger hooking portion. Hereinbelow, such a part 102b will be described as the finger hooking portion 102b that is capable of being hooked by a finger of the human operator.

With a finger hooking the finger hooking portion 102b, the human operator can apply an outward detaching force to the left rear combination lamp 17.

Such a finger hooking portion 102b can be provided by detaching the cover cap 85 from the cover body 83. Thus, the finger hooking portion 102b can be provided at a desired position neat the left stay 21 without being influenced by the left stay 21.

With the finger hooking portion 102b provided at a desired position near the left stay 21 as above, the human operator can apply an outward detaching force to the left rear combination lamp 17 with a finger hooked on the finger hooking portion 102b when the combination lamp 17 is to be detached. In this way, the human operator can readily detach the left rear combination lamp 17 from the rear outer panel 33 by merely hooking a finger on the finger hooking portion 102b and applying a detaching force to the left rear combination lamp 17.

Further, as noted above, the cover cap 85 is detachably attached to the lower side of the cover body 83 opposite from the left stay 21. Thus, the finger hooking portion 102b can be provided at a position (i.e., lower side of the cover body 83) where it is not restricted (disturbed) by the left stay 21. Thus, the human operator can hook a finger on the finger hooking portion 102b without being restricted (disturbed) by the left stay 21 and thereby detach the left rear combination lamp 17 with an even further increased ease.

As noted above, the left mounting base 24 is provided upward of the cover cap 85 (on a side opposite from the cover cap 85). Thus, the human operator can hook a finger on the finger hooking portion 102b without being restricted (disturbed) by the left stay 21 and thereby detach the left rear combination lamp 17 with an even further increased ease. Further, the abutting portion 104 of the cover body 83 is provided laterally outward, in the vehicle width direction, of the finger hooking portion 102b (housing opening portion 102).

Further, as shown in FIGS. 13 and 18, the abutting portion 104 is laterally outward, in the vehicle width direction, of the housing opening portion 102 (provided namely, provided inside the housing section 62 and inward of the housing opening portion 102 (adjacent to the lens section 61)). The abutting portion 104 is abuttingly engageable with the outer side portion 85a of the cover cap 85. The abutting portion 104 is formed to abuttingly engage with the outer side portion 85a of the cap 85.

The cap's outer side portion 85a has the projecting part 85d formed in a claw shape projecting toward a lateral outside, i.e. outside in the vehicle width direction, of the cover cap 85. Thus, when the cover cap 85 is to be mounted on or attached to the cover body 83, the projecting part 85d of the outer side portion 85a of the cap 85 can be inserted into the insertion hole 104a as the outer side portion 85a is abutted against the abutting portion 104. In this manner, the cover cap 85 can be easily positioned at a predetermined mounting position and thus can be readily attached to the cover body 83, so that operability in mounting or attaching the cover cap 85 can be enhanced.

The flange portion 106 is provided closer to the widthwise middle of the vehicle than the abutting portion 104. The flange portion 106 projects from the peripheral edge 102a of the housing opening portion 102 along the bulging surface 81a of the stay cover 81 toward the widthwise middle of the vehicle.

Because the flange portion 106 projects from the peripheral edge 102a of the housing opening portion 102, it can be provided in the finger hooking portion 102b. A finger hooked on the finger hooking portion 102b can contact, or be abutted against, the flange portion 106. Thus, a great finger hooking width W can be secured in a finger hooking region (area) 107. By abutting a finger, inserted in the finger hooking portion 102b, against the finger hooking region 107 over the great finger hooking width W, the human operator can efficiently apply an outward detaching force F to the left rear combination lamp 17.

Further, as shown in FIGS. 12 and 13, the housing mounting portion 62c protrudes from the end 62e of the side wall 62b toward the widthwise middle of the vehicle along the peripheral edge portion 33a. The housing mounting portion 62c has the mounting-portion opening groove 112 formed therein in communication with the housing opening portion 102.

The mounting-portion opening groove 112 is defined by upper and lower edges 62f and 62g of the housing mounting portion 62c. The upper edge 62f extends from an upper end part 106b of the flange portion 106 toward the widthwise middle of the vehicle. The lower edge 62g extends from a lower end part 106c of the flange portion 106 toward the widthwise middle of the vehicle.

The stay cover 81 projects rearward and upward (outward) of the vehicle body 11 from the mounting-section opening groove 112. The mounting-portion opening groove 112 has an open inner end portion 112a, so that the mounting-portion opening groove 112 can be readily detached from the stay cover 81.

The following paragraphs describe, with reference to FIG. 19, an example manner in which the left rear combination lamp 17 is detached from the rear outer panel 33.

As shown in (a) of FIG. 19, the cover cap 85 (FIG. 15) is detached from the cover body 83, so that the part 102b of the housing's opening portion 102 is opened. With the part 102b of the housing's opening portion 102 opened like this, the part 102b can be used as the aforementioned finger hooking portion.

As shown in (b) of FIG. 19, the flange portion 106 projects from the peripheral edge 102a of the housing opening portion 102, and thus, the great finger hooking width W can be secured in the finger hooking region 107. A finger, inserted in the finger hooking portion 102b, can be abutted against the finger hooking region 107.

By abutting the finger, inserted in the finger hooking portion 102b, against the finger hooking region 107, the human operator can efficiently apply an outward detaching force F to the left rear combination lamp 17. Thus, the left rear combination lamp 17 can be readily detached from the rear outer panel 33; thus, the left rear combination lamp 17 can be detached from the outer panel 33 with an enhanced operability.

It should be appreciated that the rear vehicle body structure of the present invention is not limited to the above-described preferred embodiment and may be modified variously. For example, whereas the preferred embodiment of the rear vehicle body structure has been described above in relation to the case where the tailgate 15 is supported by the left and right stays 21 and 22, the present invention is not so limited, and the tailgate 15 may be supported by any one of the left and right stays 21 and 22.

Further, whereas the preferred embodiment of the rear vehicle body structure has been described above in relation to the case where the first and second locking claws 88 and 92 are provided on the cap's engaging portion 97 and the first and second locking holes 89 and 93 are provided in the body's engaging portion 97, the present invention is not so limited. For example, the first and second locking holes 89 and 93 may be provided in the cap's engaging portion 97, and the first and second locking claws 88 and 92 may be provided on the engaging portion 96.

Furthermore, whereas the preferred embodiment of the rear vehicle body structure has been described above in relation to the case where the base portion 85b of the cover cap 85 is abutted against the rear outer panel 33 via the mounting part 84, the present invention is not so limited, and the base portion 85b may be abutted directly against the rear outer panel 33.

Furthermore, whereas the preferred embodiment of the rear vehicle body structure has been described above in relation to the case where the left and right rear combination lamps 17 and 18 are employed as lighting members, the lighting members may single lamps of a desired type, such as brake members or winker lamps.

The shapes and constructions of the rear vehicle body structure 10, vehicle body 11, opening section 12, left and right hinge members 13 and 14, tailgate 15, left and right rear combination lamps 17 and 18, left and right stays 21 and 22, left mounting base 24, roof panel 31, side panel 32, rear outer panel 33, rear inner panel 34, reinforcing member 35, roof groove portion 37, left hinge mounting section 38, housing section 62, stay cover 81, etc. are not limited to those shown and described above and may be modified as necessary.

Industrial Applicability

The rear vehicle body structure of the present invention is well suited for application to automobiles and automotive vehicles in which a tailgate is pivotably supported on a rear section of a vehicle body, and in which an opening section in the rear section of the vehicle body is openable and closable by pivoting movement of the tailgate.

Legend

10 . . . rear vehicle body structure, 11 . . . vehicle body, 12 . . . opening section, 13, 14 . . . left and right hinge members (hinge member), 15 . . . tailgate, 17, 18 . . . left and right rear combination lamps (lighting member), 17a . . . inner side edge of the left rear combination lamp, 21, 22 . . . left and right stays, 21a, 22a . . . lower end portions of the left and right stays, 21b . . . upper end portion of the stay, 24 . . . mounting base, 31 . . . roof panel, 32 . . . side panel, 33 . . . rear outer panel. 33a . . . peripheral edge portion, 33b . . . mounting part, 34 . . . rear inner panel, 35 . . . reinforcing member, 37 . . . roof groove portion, 37a . . . rear end part of the roof groove portion, 38 . . . left hinge mounting section (hinge mounting section), 41 . . . outside, 45 . . . vehicle-body-side hinge section, 46 . . . fixed portion, 47 . . . support portion, 48 . . . door-side hinge section, 48a . . . one end portion of the door-side hinge section, 48b . . . other end portion of the door-side hinge section, 61 . . . lens section (surface section), 62 . . . housing section, 64 . . . reinforcing rib, 66 . . . light source, 67 . . . transparent section, 68 . . . opaque section, 81 . . . stay cover, 83 . . . cover body, 83a . . . upper portion of the cover body, 85 . . . cover cap, 87 . . . first locking portion, 91 . . . second locking portion, 95 . . . through-hole, 97 . . . cap's engaging portion, 97a, 97b . . . edge parts of the cap, 102 . . . housing opening portion, 102a . . . peripheral edge of the opening, 102b . . . part of the opening, 104 . . . abutting portion, 106 . . . flange portion

The invention claimed is:

1. A rear vehicle body structure comprising a rear outer panel provided on a rear section of a vehicle body and a tailgate pivotably supported on a hinge mounting section of the rear outer panel via a hinge member, the rear outer panel having an opening section openable and closable by the tailgate, wherein the hinge member includes a vehicle-body-side hinge section fixed to the hinge mounting section, and a door-side hinge section pivotably connected at one end portion thereof to the vehicle-body-side hinge section and fixed at another end portion to the tailgate, a lighting member covering the vehicle-body-side hinge section from outside of the vehicle body being provided on the rear outer panel, the lighting member includes a light source and is configured to transmit light from the light source to the outside of the vehicle body.

2. The rear vehicle body structure according to claim 1, wherein the vehicle-body-side hinge section includes a fixed portion fixed to the hinge mounting section, and a support portion projecting upward from the fixed portion toward the outside of the vehicle body and having the one end portion of the door-side hinge section pivotably supported thereon, and wherein the support portion is disposed along an inner side edge, facing toward a widthwise middle of the vehicle, of the lighting member, and the door-side hinge section is pivotably supported, at one end portion thereof, on the support portion from a side opposite from the inner side edge of the support portion.

3. The rear vehicle body structure according to claim 1, wherein an outer side, facing toward the outside of the vehicle body, of the hinge mounting section is formed in an inwardly concaved shape.

4. The rear vehicle body structure according to claim 1, which further comprises: a roof panel provided on a ceiling section of the vehicle body; a side panel provided on a side section of the vehicle body by being joined to the roof panel; and a rear outer panel provided on the rear section of the vehicle body by being joined to the side panel and the roof panel, and wherein the hinge mounting section is provided continuously with a rear end part of a roof groove portion formed to extend in a front-rear direction of the vehicle body by the roof panel and the side panel being joined with each other.

5. The rear vehicle body structure according to claim 4, which further comprises a rear inner panel provided inward of the rear outer panel, and a reinforcing member provided inward of the rear outer panel and at a position corresponding to the hinge mounting section, and wherein the reinforcing member is joined to the rear inner panel, the roof panel and the side panel.

6. The rear vehicle body structure according to claim 1, wherein the lighting member has a surface section provided on an outer surface of the vehicle body, and a housing section provided inward of the surface section, and the surface section has a transparent section for transmitting therethrough light from the light source provided inside the housing section, and an opaque section for reflecting external light, the vehicle-body-side hinge section being covered with the opaque section.

7. The rear vehicle body structure according to claim 6, where the opaque section is provided on an edge portion of the surface section, and a housing extension portion is provided on the edge portion to extend from the housing section.

8. The rear vehicle body structure according to claim 7, wherein the housing extension portion has a reinforcing rib formed integrally therewith.

9. A rear vehicle body structure comprising a rear outer panel provided on a rear section of a vehicle body and a tailgate pivotably supported on a hinge mounting section of the rear outer panel via a hinge member, the rear outer panel having an opening section openable and closable by the tailgate, wherein the hinge member includes a vehicle-body-side hinge section fixed to the hinge mounting section, and a door-side hinge section pivotably connected at one end portion thereof to the vehicle-body-side hinge section and fixed at another end portion to the tailgate, a lighting member covering the vehicle-body-side hinge section from outside of the vehicle body being provided on the rear outer panel;

a stay that connects the tailgate to a peripheral edge portion, extending along the opening section, of the rear outer panel and that expands and contracts in response to opening and closing movement, respectively, of the tailgate; and a stay cover provided on a stay mounting part of the peripheral edge portion to thereby cover the stay mounting part, and wherein the housing portion of the lighting member is provided on the peripheral edge portion, the housing portion has a housing opening portion formed therein along a contour of the stay cover, and the stay cover includes a cover body provided on the mounting part of the peripheral edge portion and covering a lower end portion of the stay, and a cover cap detachably attached to the cover body, the housing opening portion being openable by detachment of the cover cap from the cover body.

10. The rear vehicle body structure according to claim 9, wherein the stay is connected at an upper end portion thereof to the tailgate and connected at a lower end portion thereof to the mounting section of the rear outer panel, the lower end portion of the stay is covered with the cover body and inserted through a through-hole formed in an upper portion of the cover body, and the cover cap is detachably attached to a lower side of the cover body.

11. The rear vehicle body structure according to claim 9, which further comprises a mounting base provided on the mounting part of the peripheral edge portion and accommodated in the cover body, and wherein the lower end portion of the stay is connected to the mounting base.

12. The rear vehicle body structure according to claim 9, wherein the cover body includes an abutting portion provided within the housing section and inward of the housing opening portion, the abutting portion being abuttingly engageable with the cover cap.

13. The rear vehicle body structure according to claim 9, wherein the housing section has a flange portion projecting from a peripheral edge of the housing opening portion along the cover cap.

14. The rear vehicle body structure according to claim 9, wherein the cover cap has a first locking portion that detachably supports one edge part of a cap's engaging portion, engageable with the cover body, on the cover body, the one edge part of the cap's engaging portion extending away from the rear outer panel, and a second locking portion that detachably supports another edge part of the cap's engaging portion on the cover body, the other edge part of the cap's engaging portion extending away from the housing opening portion.

* * * * *